United States Patent
Iwase et al.

(10) Patent No.: US 11,081,100 B2
(45) Date of Patent: Aug. 3, 2021

(54) SOUND PROCESSING DEVICE AND METHOD

(71) Applicant: SONY CORPORATION, Tokyo (JP)

(72) Inventors: Hiro Iwase, Kanagawa (JP); Mari Saito, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 16/321,295

(22) PCT Filed: Aug. 3, 2017

(86) PCT No.: PCT/JP2017/028291
§ 371 (c)(1),
(2) Date: Jan. 28, 2019

(87) PCT Pub. No.: WO2018/034168
PCT Pub. Date: Feb. 22, 2018

(65) Prior Publication Data
US 2019/0164534 A1    May 30, 2019

(30) Foreign Application Priority Data

Aug. 17, 2016 (JP) .............................. JP2016-159863

(51) Int. Cl.
*H04S 7/00* (2006.01)
*G10L 13/033* (2013.01)
(Continued)

(52) U.S. Cl.
CPC ............ *G10L 13/033* (2013.01); *G10L 13/00* (2013.01); *G10L 13/02* (2013.01); *G10L 25/27* (2013.01);
(Continued)

(58) Field of Classification Search
CPC .......... G06F 3/0482; G11B 27/34; H04S 7/40
See application file for complete search history.

(56) References Cited

U.S. PATENT DOCUMENTS 6,421,446 B1 * 7/2002 Cashion ................. H04S 1/005
381/17
6,847,778 B1 * 1/2005 Vallone ................. G11B 27/34
386/344
(Continued)

FOREIGN PATENT DOCUMENTS

CN              1629898 A      6/2005
JP              05-80755 A     4/1993
(Continued)

OTHER PUBLICATIONS

International Search Report and Written Opinion of PCT Application No. PCT/JP2017/028291, dated Oct. 24, 2017, 9 pages of ISRWO.

*Primary Examiner* — Feng-Tzer Tzeng
(74) *Attorney, Agent, or Firm* — Chip Law Group

(57) ABSTRACT

The present technology relates to a sound processing device and a method that can present progress of sound reproduction. The sound processing device includes a control unit for controlling a sound output that aurally expresses progress of sound reproduction with respect to an entirety of the sound reproduction according to the reproduction of a sound. The present technology can be applied to a sound speech progress presentation UI system.

18 Claims, 17 Drawing Sheets

(51) Int. Cl.
*H04R 3/00* (2006.01)
*G10L 13/02* (2013.01)
*G10L 13/00* (2006.01)
*G10L 25/27* (2013.01)
*G10L 25/93* (2013.01)
*G11B 27/34* (2006.01)

(52) U.S. Cl.
CPC ........... *G10L 25/93* (2013.01); *H04R 3/00* (2013.01); *G11B 27/34* (2013.01); *H04S 7/40* (2013.01)

(56) References Cited

U.S. PATENT DOCUMENTS

| | | | |
|---|---|---|---|
| 2003/0120726 A1* | 6/2003 | Archibald | H04M 3/5307 709/203 |
| 2005/0128106 A1 | 6/2005 | Nakaishi et al. | |
| 2013/0346413 A1* | 12/2013 | Moncavage | G10H 1/361 707/740 |

FOREIGN PATENT DOCUMENTS

| | | |
|---|---|---|
| JP | 11-262096 A | 9/1999 |
| JP | 2005-077663 A | 3/2005 |
| JP | 2006-090988 A | 4/2006 |
| JP | 2006-171399 A | 6/2006 |

\* cited by examiner

SOUND PROCESSING DEVICE AND METHOD

CROSS REFERENCE TO RELATED APPLICATIONS

This application is a U.S. National Phase of International Patent Application No. PCT/JP2017/028291 filed on Aug. 3, 2017, which claims priority benefit of Japanese Patent Application No. JP 2016-159863 filed in the Japan Patent Office on Aug. 17, 2016. Each of the above-referenced applications is hereby incorporated herein by reference in its entirety.

TECHNICAL FIELD

The present technology relates to a sound processing device and method and, more particularly, relates to a sound processing device and a method that can present progress of sound reproduction.

BACKGROUND ART

Until today, there has been a known system which generates sound data of a sentence of a speech text in a sound synthesis process such as text to speech (TTS) and performs a sound speech by reproducing the sound data. By using such a system, any speech text can be input to the system and a speech interaction with a user, for example, can be performed.

Furthermore, as a technology related to sound reproduction, there is a technology that moves a sound image to an arbitrary position during editing and processing. For example, as such a technology, a technology for setting a track where a sound image moves, defining a moving speed of the sound image on the basis of the setting, and generating a sound signal having the sound image moves as time passes has been proposed (for example, see Patent Document 1).

CITATION LIST

Patent Document

Patent Document 1: Japanese Patent Application Laid-Open No. 7-222299

SUMMARY OF THE INVENTION

Problems to be Solved by the Invention

Here, in the sound speech by the above described system, since only content of the sound speech is presented in chronological order, the user cannot recognize when the sound speech ends. Therefore, for example, in a case where reproduction time is long, the user may stop the reproduction without listening to an end of the sound speech and, in such a case, accurate information transmission by using the sound speech cannot be performed.

For example, in a case where list information such as selection menu items or a schedule list is informed to a user by using a sound speech and the user stops reproducing the sound speech in the middle of the sound speech, all pieces of information cannot be informed to the user.

Furthermore, for example, also in a case where a later part of the sentence is more important, such that its predicate part informs a purpose of the sound speech or the like, and the user stops reproduction in the middle of the sound speech, the important part cannot be informed to the user.

The present technology has been made in view of the above situation and realizes a progress presentation of sound reproduction.

Solutions to Problems

A sound processing device according to a first aspect of the present technology includes a control unit configured to control a sound output that aurally expresses progress of sound reproduction with respect to an entirety of the sound reproduction according to reproduction of a sound.

The sound can be made as a spoken sound based on a speech text.

The control unit can be made to control the sound output that expresses the progress by using a sound image position.

The control unit can be made to control the sound output in which an orientation position of a sound image differs in each reproduction section including a speech of a presentation item and the sound image moves toward a predetermined direction according to the progress of the sound reproduction.

The control unit can be made to identify a reproduction section corresponding to a specified direction on the basis of metadata including information indicating reproduction start time of the reproduction section of the sound and information related to a direction of the sound image in the reproduction section, and operate to start reproducing the sound from the specified reproduction section.

A range including the direction of the sound image in the reproduction section can be defined for each reproduction section so that the reproduction section including the presentation item with a higher level of importance is allocated with a wider range. The control unit can be made to identify the reproduction section having the range including the specified direction on the basis of the metadata and operate to start reproducing the sound from the specified reproduction section.

The control unit can be made to control an output of the sound in which the sound image continuously moves toward a predetermined direction according to the progress of the sound reproduction.

The control unit can be made to control the sound output that expresses the progress by operating to reproduce a background sound that expresses the progress of the sound reproduction while operating to reproduce the sound.

The background sound can be made as a piece of music having reproduction time substantially the same as a length of the sound.

The background sound can be made as a sound that counts down time remaining before the sound reproduction ends.

The background sound can be made as a sound that informs time remaining before the sound reproduction ends or a progress rate of the sound reproduction, at predetermined time intervals.

A sound processing method according to the first aspect of the present technology includes a step of controlling a sound output that aurally expresses progress of sound reproduction with respect to an entirety of the sound reproduction according to reproduction of a sound.

The first aspect of the present technology is to control a sound output that aurally expresses progress of sound reproduction with respect to an entirety of the sound reproduction according to reproduction of a sound.

A sound processing device according to a second aspect of the present technology includes a reproduction control unit configured to identify a reproduction section corresponding to a specified direction on the basis of metadata including information indicating reproduction start time of the reproduction section in a sound, in which an orientation position of a sound image differs in each reproduction section and the sound image moves toward a predetermined direction according to progress of sound reproduction with respect to an entirety of the sound reproduction, and information related to a direction of the sound image in the reproduction section, and operate to start reproducing the sound from the specified reproduction section.

A sound processing method according to the second aspect of the present technology includes a step of identifying a reproduction section corresponding to a specified direction on the basis of metadata including information indicating reproduction start time of the reproduction section in a sound, in which an orientation position of a sound image differs in each reproduction section and the sound image moves toward a predetermined direction according to progress of sound reproduction with respect to an entirety of the sound reproduction, and information related to a direction of the sound image in the reproduction section, and operating to start reproducing the sound from the specified reproduction section.

The second aspect of the present technology is to identify a reproduction section corresponding to a specified direction on the basis of metadata including information indicating reproduction start time of the reproduction section in a sound, in which an orientation position of a sound image differs in each reproduction section and the sound image moves toward a predetermined direction according to progress of sound reproduction with respect to an entirety of the sound reproduction, and information related to a direction of the sound image in the reproduction section, and operate to start reproducing the sound from the specified reproduction section.

Effects of the Invention

According to the first and second aspects of the present technology, progress of sound reproduction can be presented.

Note that effects described here should not be limited and may be any one of the effects described in this disclosure.

MODE FOR CARRYING OUT THE INVENTION

Figure 1:
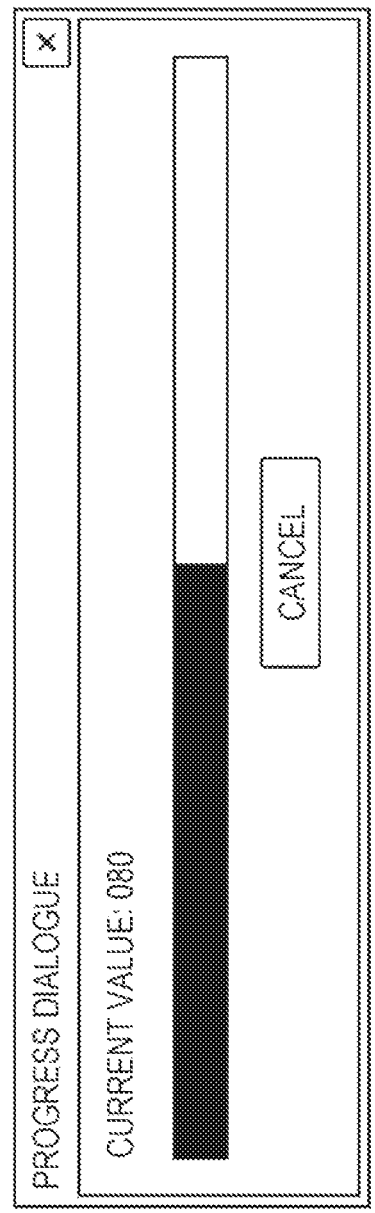
FIG. 1 is a diagram for explaining a progress bar.

In the following, an embodiment to which the present technology is applied will be described with reference to the drawings.

First Embodiment

<About the Present Technology>

The present technology realizes a presentation of progress of a spoken sound (speech reproduction) to a user, by outputting a sound that aurally expresses the progress with respect to entire spoken sound reproduction corresponding to the reproduction of the spoken sound, in a case where a sound speech of a speech text is performed.

More specifically, for example, by moving the sound image position according to the progress of the speech during the sound speech, the user can aurally recognize, on the basis of the sound image positions, an entire amount of the speech and how much the reproduction of the spoken sound has proceeded at a current timing.

For example, as an example of a sound image position movement corresponding to speech progress, which is a sound image orientation method, it can be assumed to control the sound image to move from left to right as seen from the user, corresponding to a visual progress bar, which is generally familiar to the user.

By moving the sound image position in this manner, since the user can aurally recognize the length of the entire speech and the progress of the sound speech on the basis of the sound image positions, the user can perform an operation related to the reproduction of the spoken sound on the basis of the recognition result. With this arrangement, the user can perform a sound reproducing operation suitable to the user's condition, such as terminating (stopping) the reproduction of the spoken sound, repeating reproduction of a predetermined section, or increasing or decreasing the speech speed, as considering remaining time of the spoken sound or the like, for example.

Hereinafter, the present technology will be described in detail.

For example, in a case where a user obtains information from a system via a display device such as a display, the user can recognize an amount of the entire document and how much the reading has proceeded by an overview of the displayed sentence or according to visual information such as a scroll bar on the Web browser.

On the other hand, in a case of obtaining information by sound speech from the system without visual information, the user cannot recognize an amount of the entire speech and how much the reading has proceeded since sound is aurally input only in chronological order. Therefore, since the user cannot recognize when the speech itself ends, in some cases, the user may give up listening to the sound speech to the end. This results in that the user cannot obtain necessary information.

Therefore, according to the present technology, with a sound image movement, that is, with a position of a sound image at each time, a user interface (UI) that presents an entire amount of a sound speech and a listening progress is realized. In other words, a UI that expresses progress of sound reproduction by using a direction where a sound image is located is realized.

In general, as a UI of a progress presentation using visual information, a progress bar as illustrated in FIG. 1 is used in a device such as a computer. The UI to which the present technology is applied is a UI that helps the user to recognize the progress bar, which is familiar as a general visual progress presentation UI, only with sense of hearing using a sound image movement of a spoken sound.

Figure 2:
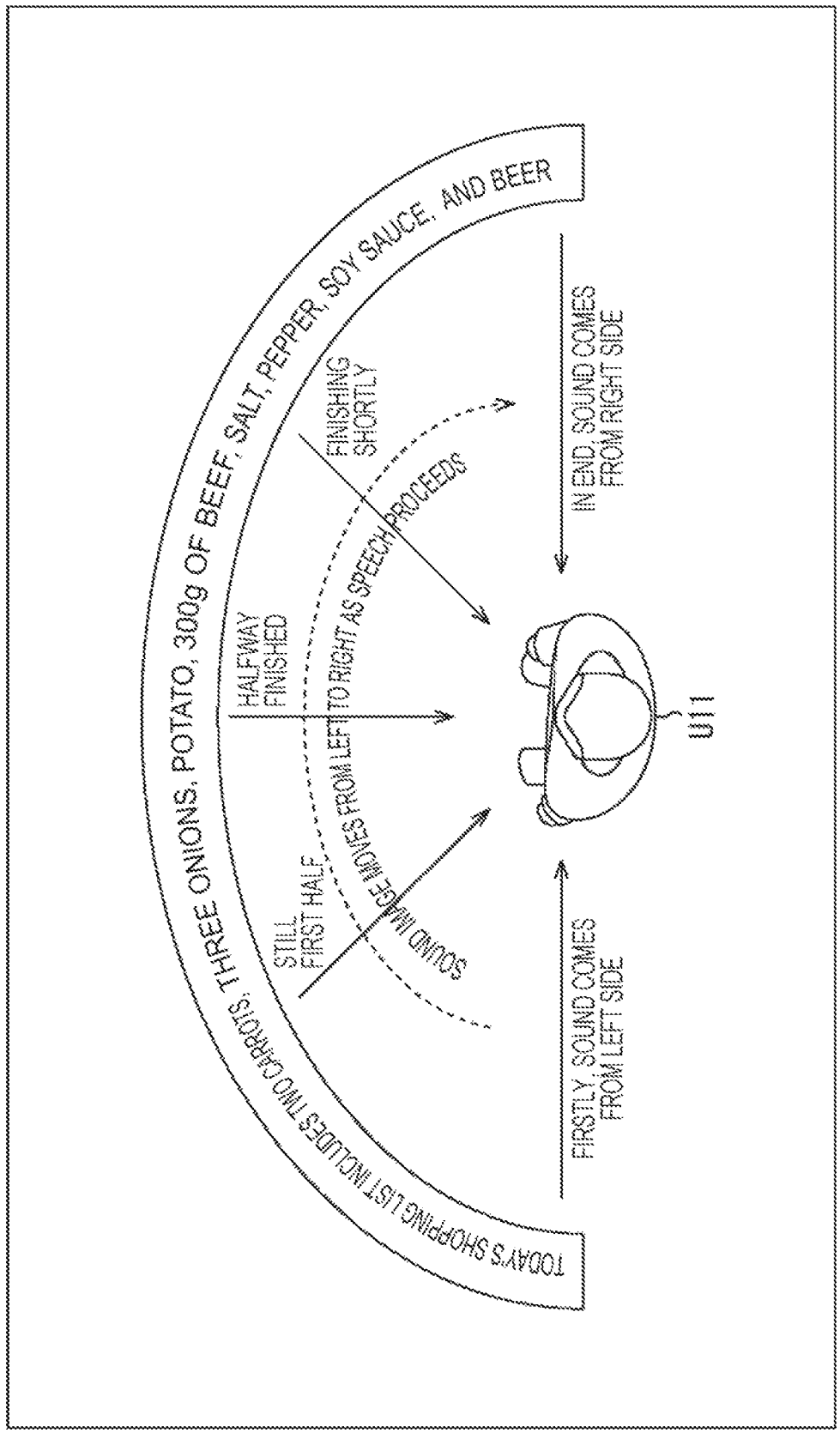
FIG. 2 is a diagram for explaining movement of a sound image according to progress.

Here, an example of a progress presentation of a sound speech using a sound image movement is illustrated in FIG. 2.

The example illustrated in FIG. 2 is an example that a system such as a sound agent provides registered shopping list information to a user U11 with a sound speech.

In this example, content that is spoken by the system is "Today's shopping list includes two carrots, three onions, a potato, 300 g of beef, salt, pepper, soy sauce, and beer."

It is assumed that the user U11 is in an audiovisual environment in which orientation of a sound image in right and left can be recognized, with headphones, a stereo speaker system, a surround speaker system, or the like.

Here, in a case where the system performs a sound speech, that is, in a case where a spoken sound is reproduced, the spoken sound is firstly heard from a left side as seen from the user U11. In other words, in the first part of the spoken sound, "Today's shopping list includes," the sound image of the spoken sound is oriented in the left side of the user U11.

After that, as the reproduction of the spoken sound proceeds, the sound image gradually moves rightward. For example, a middle part of the spoken sound, "a potato," is reproduced to be heard by the user U11 from straight forward direction. In other words, in the part of "a potato" of the spoken sound, the sound image is oriented in direction (position) of straight front of the user U11.

Then, as the reproduction of the spoken sound proceeds, the sound speech ends after the spoken sound is lastly heard from a right side of the user U11. In this example, the last part of the spoken sound, "and beer." is heard from the right side of the user U11. In other words, in the part of "and beer." of the spoken sound, the sound image is oriented to a position in the right side of the user U11.

Note that, in more detail, for example, while each part of the spoken sound such as "Today's shopping list includes" or the like is being reproduced, the sound image moves rightward almost continuously.

By moving the sound images of the spoken sound from the left side to the right side of the user U11 almost continuously corresponding to the reproduction state of the sound speech, that is, the progress of the speech, in this manner, the user U11 can recognize an approximate time of the entire sound speech on the basis of a speed of the sound image moving rightward after the speech has started.

Furthermore, the user U11 can recognize how much of the entire sound speech has finished at a moment, that is, how much the reproduction of the spoken sound has proceeded, on the basis of from which direction the spoken sound is heard, that is, the sound image position of the spoken sound, during the sound speech. With this arrangement, the user U11 can recognize remaining speech time.

For example, the user U11 recognizes the progress of the spoken sound on the basis of the sound image position such that a first quarter is finished in a case where the sound image position of the spoken sound is in diagonally forward left of the user U11, that a first half is finished in a case where the sound image position is straight forward of the user U11, that three quarters are finished in a case where the sound image position is in diagonally forward right of the user U11, or the like. Furthermore, since the user U11 can intuitively recognize how long the remaining reproduction time of the spoken sound by time sense of how long the user U11 has listened spoken sound, this can motivate the user U11 to listen to the speech to an end.

Furthermore, in a case where the user U11 is provided with a means for reproducing operation such as repeating the reproduction of the spoken sound, increasing or decreasing the speech speed, and stopping the reproduction, the user U11 can select an appropriate reproducing operation according to how much time the user U11 has and the recognition of the remaining speech time. For example, it allows the user U11 to increase the speech speed and concentrate on listening if the user U11 does not have much time but the spoken sound takes much time to the end, decrease the speech speed and listening slowly repeatedly if the user U11 has much time, or give up and stop the reproduction if the user U11 does not have time and there is still too much remaining spoken sound.

Note that, an example that a sound image of a spoken sound moves from left to right of a user will be explained here; however, the direction of the movement of the sound image may be any direction such as from right to left, in a vertical direction, or in a front-back direction. For example, the movement direction of the sound image may be changed according to a language of the spoken sound such that the sound image moves from right to left in a case where the language of the spoken sound is Persian or that the sound image moves from up to down in a case where the language of the spoken sound is Chinese, for example.

Furthermore, an example that the sound image of the spoken sound moves by 180 degrees from left to right of the user has described here; however, in addition to this example, the sound image can be moved by preferred degrees such that the sound image moves by 90 degrees from left side to a strait front of the user, for example.

Configuration Example of Sound Speech Progress Presentation UI System

Figure 3:
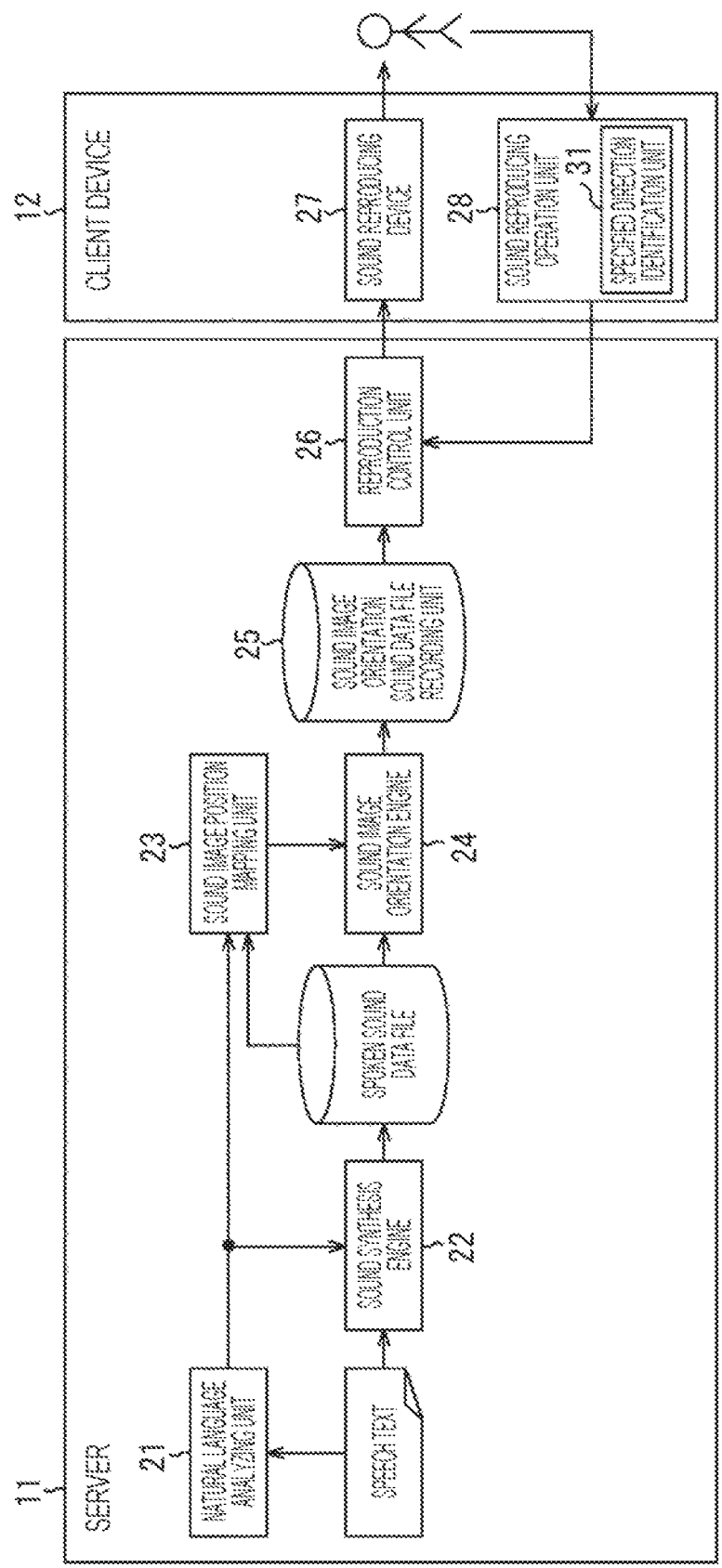
FIG. 3 is a diagram illustrating a configuration example of a sound speech progress presentation UI system.

FIG. 3 is a diagram illustrating a configuration example of an embodiment of a sound speech progress presentation UI system to which the present technology is applied.

The sound speech progress presentation UI system to which the present technology is applied is a system which includes a server 11 and a client device 12 and provides a sound speech to a user. In this example, the server 11 and the client device 12, which is a terminal device such as a smartphone, are directly connected wired, wirelessly, or the like, or indirectly connected via a communication network.

The server 11 serves as a sound processing device, generates a sound image orientation sound data file for reproducing spoken sound while aurally presenting progress of the sound speech with a movement of the sound image on the basis of a speech text which is text data indicating speech content, and outputs the file to the client device 12. The client device 12 outputs the spoken sound to the user on the basis of the sound image orientation sound data file provided from the server 11.

The server 11 includes a natural language analyzing unit 21, a sound synthesis engine 22, a sound image position mapping unit 23, a sound image orientation engine 24, a sound image orientation sound data file recording unit 25, and a reproduction control unit 26. Furthermore, the client device 12 includes a sound reproducing device 27 and a sound reproducing operation unit 28.

Note that an example that the reproduction control unit 26 is provided in the server 11 will be described here; however, the reproduction control unit 26 may be provided in the client device 12.

To the natural language analyzing unit 21 and sound synthesis engine 22 in the server 11, a speech text, which is an entire sentence of information content to be presented to the user using a sound speech, is input.

The natural language analyzing unit 21 performs a natural language analysis, which is a linguistic analysis process, on the input speech text and provides the analysis result to the sound synthesis engine 22 and sound image position mapping unit 23. For example, in the natural language analysis, information indicating a dependency structure of phrases of the sentence in the speech text and information indicating a linguistic case of each phrase are obtained.

The sound synthesis engine 22 performs a sound synthesis process on the provided speech text and generates a spoken sound data file including sound data for reproducing speech words with sound.

Furthermore, in a case where the spoken sound data file is generated, the sound synthesis engine 22 generates reproduction time information indicating reproduction time of the spoken sound corresponding to a desired position in the sentence of the speech text by using the analysis result provided from the natural language analyzing unit 21 as appropriate and stores the reproduction time information in the spoken sound data file.

For example, the sound synthesis engine 22 can add, to the spoken sound data file, reproduction time information indicating what time in the reproduction there is a markup tag, which is a phrase pausing point, in the sound data of the spoken sound during the sound synthesis process, by inserting a markup tag to a phrase pausing point in the sentence of the speech text on the basis of the result of the natural language analysis.

The spoken sound data file generated by the sound synthesis engine 22 is provided to the sound image position mapping unit 23 and sound image orientation engine 24.

The sound image position mapping unit 23 generates sound image position information, which is information related to sound image positions in a chronological order, and metadata on the basis of the analysis result from the natural language analyzing unit 21 and the spoken sound data file from the sound synthesis engine 22 and provides the information and metadata to the sound image orientation engine 24.

Here, the sound image position information is information related to a divided reproduction section obtained by dividing an entire reproduction section of the sound data included in the spoken sound data file and a position of the sound image, which is the direction where the sound image is placed, of the divided reproduction section. In the following, the direction where the sound image is located is also referred to as a sound image direction or a direction of the sound image.

More specifically, regarding each divided reproduction section, the sound image position information includes divided reproduction section information indicating a divided reproduction section and phase difference information indicating a phase difference of a sound data sample of each channel such as a left channel and a right channel, which is used to orient the sound image to a direction where the divided reproduction section is mapped.

Furthermore, the metadata includes information indicating reproduction start time of each reproduction section of the spoken sound and information related to the direction of the sound image in each reproduction section. More specifically, for example, the metadata includes phrase reproduction start time information indicating reproduction time of the sound data corresponding to a leading position of each phrase in a case where the sentence of the speech text is divided into a plurality of phrases, and phrase end angle information, which is angle information indicating a sound image direction of an end position of each phrase.

In a case where such metadata is generated in advance, the spoken sound can be reproduced from any preferred phrase in reproducing the spoken sound. The metadata is metadata of sound image orientation sound data included in the sound image orientation sound data file.

Note that, in the following, the reproduction time indicated by the phrase reproduction start time information is also referred to as phrase reproduction start time, and the angle indicted by the phrase end angle information is also referred to as a phrase end angle.

The sound image orientation engine 24 generates a sound image orientation sound data file on the basis of the spoken sound data file from the sound synthesis engine 22 and the sound image position information and metadata from the sound image position mapping unit 23 and provides the file to the sound image orientation sound data file recording unit 25.

Here, the sound image orientation sound data file includes the sound image orientation sound data for reproducing the spoken sound so that the sound image of each divided reproduction section of the spoken sound in the speech text is oriented to the sound image direction mapped by the sound image position mapping unit 23 and the metadata generated by the sound image position mapping unit 23. For example, the sound image orientation sound data is supposed to be two channels of right and left, that is, stereo sound data, or multiple-channel sound data.

The sound image orientation sound data file recording unit 25 records the sound image orientation sound data file provided from the sound image orientation engine 24 and provides the recorded sound image orientation sound data file to the reproduction control unit 26 as needed.

The reproduction control unit 26 reads the sound image orientation sound data file from the sound image orientation sound data file recording unit 25 according to an operation signal from the sound reproducing operation unit 28 and outputs the file to the sound reproducing device 27 to control the reproduction of the spoken sound based on the sound image orientation sound data.

In other words, the reproduction control unit 26 controls a sound output that aurally expresses the progress of the spoken sound reproduction with respect to the entire reproduction corresponding to the reproduction of the spoken sound by outputting a sound image orientation sound data file of a spoken sound in which a sound image direction (sound image position) moves corresponding to the progress of the speech.

The sound reproducing device 27 includes, for example, a surround speaker of a stereo or multiple-channel home theater system, headphones, and the like and generates a spoken sound on the basis of the sound image orientation sound data file output from the reproduction control unit 26. With this arrangement, the user can listen to spoken sound in which the sound image moves according to a sound reproduction state, which is progress of the speech.

The sound reproducing operation unit 28 includes a key (button), a sound recognition unit, or the like, for example, generates an operation signal, which instructs a reproducing operation such as stopping or repeating reproduction, and increasing or decreasing a reproduction speed, according to an input operation by the user, and provides the operation signal to the reproduction control unit 26.

For example, in a case where the user instructs to stop or repeat of the spoken sound reproduction, increase or decrease the reproduction speed, and the like with a key operation, a sound input, or the like according to user's available time, an operation signal corresponding to the instruction by the user is output from the sound reproducing operation unit 28 to the reproduction control unit 26. Then, the reproduction control unit 26 controls the reproduction of the spoken sound according to the operation signal from the sound reproducing operation unit 28.

Note that, in a case where the reproduction of the spoken sound is stopped, for example, the reproduction control unit 26 may record a position where the reproduction is stopped, which is reproduction time, and resume the reproduction from the position where the reproduction is lately stopped in a case where the reproduction of the spoken sound is restarted.

Furthermore, the sound reproducing operation unit 28 includes a specified direction identification unit 31. The specified direction identification unit 31 includes a camera, a sensor, a recognizer, or the like, for example, and identifies a direction specified by the user by an image recognition, a face recognition, a gesture recognition, a line-of-sight recognition, or the like. Note that, in the following, the direction specified by the user is also referred to as a specified direction.

For example, the user specifies a desired direction as a specified direction by turning eyes to the desired direction, gesturing as pointing a finger to the desired direction, turning their face toward the desired direction, or the like. The specified direction specified in this manner is used, for example, for a random access reproduction of the spoken sound based on the sound image orientation sound data.

For example, the metadata in the sound image orientation sound data file includes the phrase reproduction start time information indicating the phrase reproduction start time and the phrase end angle information indicting the phrase end angle. Therefore, in a case where the user specifies a direction corresponding to a desired phase as a specified direction, the reproduction can be performed from a position corresponding to any phrase in the spoken sound. In other words, the random access reproduction of the spoken sound is available.

When the user specifies a specified direction to perform a random access reproduction, the specified direction identification unit 31 identifies the specified direction specified by the user by an image recognition and the like. Furthermore, the sound reproducing operation unit 28 generates an operation signal including information indicating the specified direction identified by the specified direction identification unit 31, and provides the signal to the reproduction control unit 26. With this arrangement, the reproduction control unit 26 can start reproducing the spoken sound from the phrase reproduction start time of the phrase corresponding to the specified direction.

The random access reproduction described above is effective in a case of re-listening of the spoken sound, for example. Note that, in the random access reproduction, although the reproduction may be started from a reproduction time corresponding to the specified direction, since a specification accuracy of user's specified direction is limited, the reproduction is started from a leading position of the phrase corresponding to the specified direction.

Note that, in the client device 12, the sound reproducing operation unit 28 may be provided integrally with the sound reproducing device 27 or may be provided separately from the sound reproducing device 27.

<About Reproduction Process>

Next, operation of the above described sound speech progress presentation UI system will be described. In other words, in the following, a reproduction process by the sound speech progress presentation UI system will be described with reference to the flowchart of FIG. 4. The reproduction process is started when a speech text for a sound speech is provided to the server 11 or a speech text is specified.

In step S11, the natural language analyzing unit 21 performs a natural language analysis on the input speech text and provides the analysis result to the sound synthesis engine 22 and sound image position mapping unit 23. For example, in step S11, a morphological analysis or the like is performed, and information indicating a dependency structure of phrases in the sentences of the speech text and information indicating a linguistic case of each phrase are obtained as the analysis result.

In step S12, the sound synthesis engine 22 generates a spoken sound data file by performing a sound synthesis process on the provided speech text and provides the file to the sound image position mapping unit 23 and sound image orientation engine 24.

Note that, in a case where the spoken sound data file is generated, the sound synthesis engine 22 generates reproduction time information indicating a reproduction time of a spoken sound corresponding to a pausing point of a phrase in the sentence of the speech text on the basis of the analysis result from the natural language analyzing unit 21 and stores the information in the spoken sound data file.

In step S13, the sound image position mapping unit 23 generates sound image position information and metadata on the basis of the analysis result from the natural language analyzing unit 21 and the spoken sound data file from the sound synthesis engine 22, and provides the information and metadata to the sound image orientation engine 24.

For example, the sound image position mapping unit 23 divides the entire reproduction section of the sound data into a plurality of divided reproduction sections and generates sound image position information by mapping each divided reproduction section to a predetermined sound image direction. Furthermore, the sound image position mapping unit 23 generates metadata on the basis of the divided reproduction section mapping result, natural language analysis result, and reproduction time information.

In step S14, the sound image orientation engine 24 generates a sound image orientation sound data file on the basis of the spoken sound data file from the sound synthesis engine 22 and the sound image position information and metadata from the sound image position mapping unit 23.

In other words, the sound image orientation engine 24 generates sound image orientation sound data that orients the sound image to a desired sound image direction on the basis of the spoken sound data file and sound image position information, and also generates a sound image orientation sound data file on the basis of the obtained sound image orientation sound data and metadata. The sound image orientation engine 24 provides the sound image orientation sound data file obtained in this manner to the sound image orientation sound data file recording unit 25 to record the file.

In step S15, the reproduction control unit 26 reads and provides the sound image orientation sound data file recorded in the sound image orientation sound data file recording unit 25 to the sound reproducing device 27 and reproduces the spoken sound based on the sound image orientation sound data.

The sound reproducing device 27 reproduces the spoken sound on the basis of the sound image orientation sound data file provided from the reproduction control unit 26. With this arrangement, the user can listen to spoken sound in which the sound image continuously moves from left to right according to the progress of the reproduction of the sound image.

Furthermore, the user performs an operation on the sound reproducing operation unit 28 as appropriate while listening to the spoken sound, and the sound reproducing operation unit 28 generates an operation signal corresponding to the user's operation and provides the signal to the reproduction control unit 26. Then, the reproduction control unit 26 controls the reproduction including stopping the reproduction, changing the speech speed, or the like corresponding to the user's operation as appropriate by stopping output of the sound image orientation sound data file or the like in response to the operation signal from the sound reproducing operation unit 28.

When the spoken sound based on the sound image orientation sound data file is reproduced, the reproduction process ends.

As described above, the sound speech progress presentation UI system generates, from the speech text, a sound image orientation sound data file for reproducing the spoken sound in which the sound image moves according to the progress of the sound speech and reproduces the spoken sound.

The progress state of the sound reproduction can be presented to the user by performing a sound output that aurally expresses the progress with respect to the entire spoken sound, such as moving a sound image according to the progress of the reproduction of the spoken sound as described above.

This arrangement helps the user easily receive all information provided by the speech since the user can recognize how much longer the reproduction of the sound speech lasts with respect to the entire sound speech and thus the user is motivated to listen to the speech to the end.

Furthermore, the user can perform an operation according to the user's needs by changing the speech speed or the like on the basis of the result of recognizing the entire speech amount, according to how much time the user has available, which is how much longer the user can continue to listen to the speech, while listening to the sound speech.

For example, in a case where the user has enough time, the user can carefully listen to the sound speech to sufficiently understand the speech content by decreasing the speech speed or repeating the reproduction. Furthermore, for example, in a case where the user has little time, the user can concentrate on listening to the sound speech in a short time by increasing the speech speed.

According to the sound speech by the sound speech progress presentation UI system, since a sound image is oriented to a position (direction) corresponding to the progress of the sound speech, the user can recognize a state of how much the reproduction has proceeded with respect to the entire speech on the basis of the position of the sound image in a case where the user starts to listen to the sound speech in the middle of the speech for example.

Furthermore, according to the sound speech by the sound speech progress presentation UI system, since the progress of the sound speech can be presented without a device to output visual information such as a display, the cost of the device or visual information area of a product to which the present technology is applied can be reduced.

<About Mapping Process>

Here, a more detailed process example of a case of generating the sound image position information and metadata in step S13 of FIG. 4 will be described. In other words, a mapping process by the sound image position mapping unit 23 will be described with reference to the flowchart of FIG. 5.

Figure 4:
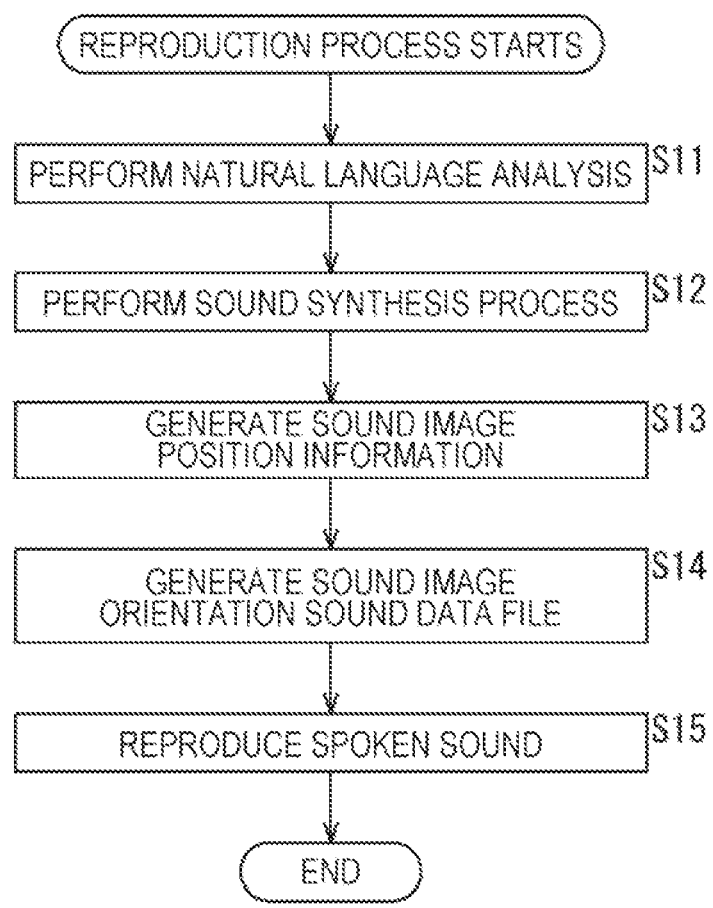
FIG. 4 is a flowchart for explaining a reproduction process.

The mapping process is a process that the sound image position mapping unit 23 maps a divided reproduction section to a sound image direction and generates sound image position information and metadata, and corresponds to the process in step S13 of FIG. 4.

In step S41, the sound image position mapping unit 23 calculates entire speech time, which is an entire reproduction time length of the spoken speech, on the basis of a data length of the sound data of the spoken sound included in the spoken sound data file from the sound synthesis engine 22 and a sampling rate of the sound data. The entire speech time is a length of the reproduction time in a case where the spoken sound is reproduced from the beginning to the end on the basis of the sound data.

In step S42, the sound image position mapping unit 23 calculates a dividing number of the sound image direction indicating how many numbers of directions the sound image is oriented, which is how many numbers the sound image direction is divided, during the spoken sound reproduction on the basis of the sampling rate of the sound data.

The dividing number of the sound image direction indicates the number of sound image direction to which the sound image is moved (oriented) during the reproduction of the spoken sound, that is granularity of dividing of the sound image direction.

For example, as the dividing number of the sound image direction is increased, a sense as if the sound image moves smoothly during the spoken sound reproduction can be given to the user.

In this example, a case in which a method for outputting a same sound source having phase differences to right and left ears of the user respectively, which is a method for orienting the sound image by reproducing with the sound data of the respective right and left channels having a phase difference, is used as a method for orienting the sound image of the spoken sound will be described.

Such a sound image orientation method is generally known as a sound image orientation method for using headphones or the like as a reproduction device, for example. In the sound image orientation method, a complementing process between samples is not needed since a phase difference is provided to the sound data of each right and left channels with granularity of the samples of the sound data, and a sound image orientation with a few calculation can be realized.

In particularly, more specific phase differences can be made as sampling rate of the sound data is higher, smoother sound image movement can be realized.

Furthermore, it is assumed that, as seen from the user, a straight leftward direction of the user is −90 degrees (90°), a straight forward direction of the user is 0 degree, and a straight rightward direction of the user is +90 degrees.

Furthermore, a sound velocity is represented by c, a sampling rate of sound data is represented by f, and a distance between right and left ears of the user, which is a distance between both ears of the user, is represented as d. Note that, as the distance d between both ears, a distance in the case of an average person can be used.

In such as a case, to orient a sound image of a spoken sound to a straight leftward of the user, which is the direction of −90 degrees, a phase difference of sound data in the right and left channels may be used as d/(c/f) sample.

For example, in a case where the distance between both ears d is 25 [cm], the sound velocity c is 340 [m/s], and the sampling rate f is 16 [kHz], if a phase difference of about 12 samples is applied to the sound data in the right and left channels, the sound image is oriented to a straight leftward direction of the user in reproducing the spoken sound based on the sound data.

In this case, it is assumed that the sound image during the speech moves from the straight leftward direction of the user, which is −90 degrees, to the straight forward direction (0 degree direction) and the straight rightward direction (+90 degrees direction) within an amount of 180 degrees. Furthermore, assuming that the sound image is oriented by using a phase difference as sample granularity, which is a case where the sound image is moved by granularity of a phase difference of a single sample, a dividing number of the sound image direction can be obtained by following Equation (1).

[Equation 1]

[the dividing number]=[the number of phase difference samples in straight leftward]+[the number of phase difference samples in straight rightward]+1=d/(c/f)×2+1  (1)

Note that, in Equation (1), (the number of phase difference samples in straight leftward) is the number of samples indicating a phase difference needed to orient the sound image in the straight leftward direction, and (the number of phase difference samples in straight rightward) is the number of samples indicating a phase difference needed to orient the sound image in the straight rightward direction. In this example, the number of the phase difference samples in the straight leftward and the number of the phase difference samples in the straight rightward both become d/(c/f) samples. Furthermore, "1" which is added in Equation (1) corresponds to the straight forward direction.

The sound image position mapping unit 23 calculates the dividing number of the sound image direction in the spoken sound reproduction by calculating above described Equation (1) on the basis of the sound data sampling rate.

In step S43, the sound image position mapping unit 23 calculates time per one sound image direction by dividing the entire speech time obtained in step S41 with the dividing number obtained in step S42.

Here, the time per one sound image direction is spoken sound reproduction time in a period that the sound image is oriented to a single sound image direction in the spoken sound reproduction. In other words, during the reproduction time, the sound image is oriented to the single sound image direction.

The sound image position mapping unit 23 divides the entire section of the sound data into a plurality of divided reproduction sections subsequently in such a manner that assuming a section of a time length of each sound image direction from the beginning of the sound data of the spoken sound is a leading divided reproduction section and a section of a time length of each sound image direction having an end portion of the divided reproduction section as a beginning is a following divided reproduction section.

In other words, the sound image position mapping unit 23 assumes that the respective section obtained by equally dividing the entire reproduction section of the sound data of the spoken sound into a dividing number of the sound image direction as a divided reproduction section. Here, the reproduction time in a case where each divided reproduction section is reproduced corresponds to time of a single sound image direction obtained in step S43.

In step S44, the sound image position mapping unit 23 maps the divided reproduction section having its beginning of the sound data of the spoken sound to the straight leftward direction.

In other words, the sound image position mapping unit 23 sets the respective divided reproduction section of the sound data of the spoken sound as a process target divided reproduction section in order from the beginning.

Therefore, it is assumed that the leading divided reproduction section is the process target divided reproduction section, and the sound image position mapping unit 23 orients the sound image to the straight leftward direction in a case where the divided reproduction section is reproduced by mapping the process target divided reproduction section in the straight leftward direction as seen from the user.

More specifically, the sound image position mapping unit 23 sets sound image position information of the process target divided reproduction section by associating the divided reproduction section information indicating the process target divided reproduction section with phase difference information indicating a sample number d/(c/f), which is a phase difference of sound data in the right and left channels needed to orient the sound data to the straight leftward direction. In this case, the sound image direction of the leading divided reproduction section as a process target is the straight leftward direction.

The sound image position mapping unit 23 sets the divided reproduction section temporally next to the current process target divided reproduction section as a following process target divided reproduction section, and the process proceeds to step S45.

In step S45, the sound image position mapping unit 23 maps the following divided reproduction section, which is the divided reproduction section set as a new process target to a direction, which is a direction that a moving angle is added to an angle of a sound image direction of the temporally immediate previous divided reproduction section of the divided reproduction section.

Here, the moving angle of the sound image direction is an angle indicating a moving amount in a case where the sound image moves from one sound image direction to a next sound image direction, which is an angle of a difference between an angle of one sound image direction and an angle of a next sound image direction. The moving angle is defined by the dividing number of the sound image direction obtained in step S42. In other words, the moving angle becomes 180/(dividing number−1) degrees.

Therefore, for example, the sound image direction of the second divided reproduction section from the leading part becomes a direction of an angle obtained by adding a moving angle to the angle of the straight leftward direction (−90 degrees).

The sound image position mapping unit 23 sets sound image position information of a process target divided reproduction section by associating the divided reproduction section information indicating the process target divided reproduction section with the phase difference information indicating a phase difference of sound data of the right and left channels needed to orient the sound image to the sound image direction of the process target divided reproduction section.

In this case, the phase difference information of the process target divided reproduction section can be a value that one sample is shifted from the sample number indicated by the phase difference information of the divided reproduction section immediately previous to the process target divided reproduction section.

Therefore, in step S45, the process target divided reproduction section is oriented to a direction that the sound image direction of the immediately previous divided reproduction section is shifted to a positive direction, which is the rightward direction as seen from the user, by a phase difference amount of one sample time.

In step S46, the sound image position mapping unit 23 determines whether or not the sound image direction of the process target divided reproduction section is in the straight rightward direction. In other words, it is determined whether or not mapping of sound image direction is performed for all the divided reproduction sections.

In a case where it is determined that the sound image direction is not the straight rightward direction in step S46, the sound image position mapping unit 23 sets a divided reproduction section temporally next to the divided reproduction section of the current process target as a new process target divided reproduction section, and the process returns to step S45 to repeat the above described processes.

On the other hand, in a case where it is determined that the sound image direction is the straight rightward direction in step S46, since the process has been performed for all the divided reproduction sections, the process proceeds to step S47.

In this case, with the above processes, the sound image position information for all the divided reproduction sections is obtained.

Figure 6:
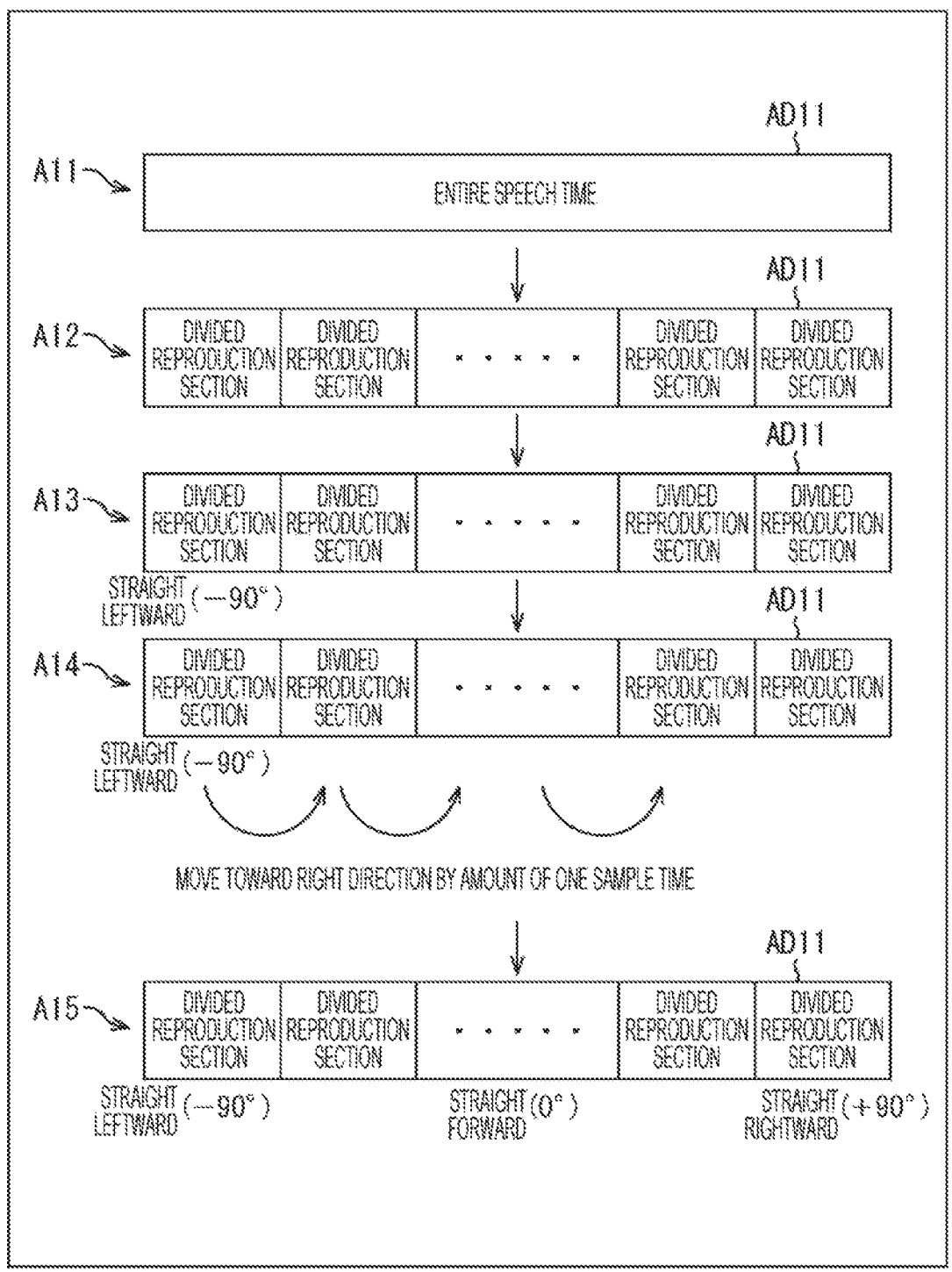
FIG. 6 is a diagram for explaining generation of sound image position information.

In other words, in the processes in steps S41 to S46, for example, the sound image position information is generated as illustrated in FIG. 6.

Firstly, in step S41, as illustrated with the arrow A11, reproduction time of all sections AD11 of the spoken sound, which is an entire speech time, is calculated. Note that, in this case, a left end of the illustrated figure of the all sections AD11 indicates a lead position, and a right end of the illustrated figure of the all sections AD11 indicates an end position.

In step S43, as indicated by the arrow A12, by calculating time per one sound image direction, the all sections AD11 is divided into divided reproduction sections of dividing number obtained in step S42. In this case, the rectangular shape in the all sections AD11 represents one divided reproduction section and the length of each divided reproduction section is made the same length.

In step S44, as indicated by the arrow A13, the leading divided reproduction section is mapped in the straight leftward direction.

After that, in steps S45 and S46, as indicated by the arrow A14, a process in which a divided reproduction section subsequent to the mapped divided reproduction section is mapped in a direction that the sound image direction of the immediately previous divided reproduction section is shifted to rightward with an amount of a phase difference of one sample time is repeated. When such a process is repeated, as indicated by the arrow A15, a last divided reproduction section is mapped to the straight rightward direction and, with this arrangement, sound image position information including divided reproduction section information and phase difference information of each divided reproduction section can be obtained.

When the sound image position information is obtained in this manner, in reproducing a spoken sound obtained by using the sound image position information, the sound image is oriented as follows.

That is, in a leading part of the spoken sound, the sound image is oriented to the straight leftward direction, and then, the sound image is shifted rightward on the basis of granularity of the dividing number of the sound image direction, which is, in units of above described moving angles. In this case, while one divided reproduction section is being reproduced, the sound image is kept oriented to one sound image direction.

As the reproduction of the spoken sound proceeds, in a middle part of the spoken sound, which is a midmost part, is reproduced, the sound image is oriented to the straight forward direction of the user, then, in an end part of the spoken sound, the sound image is oriented to the straight rightward direction, and the reproduction of the spoken sound ends.

Figure 5:
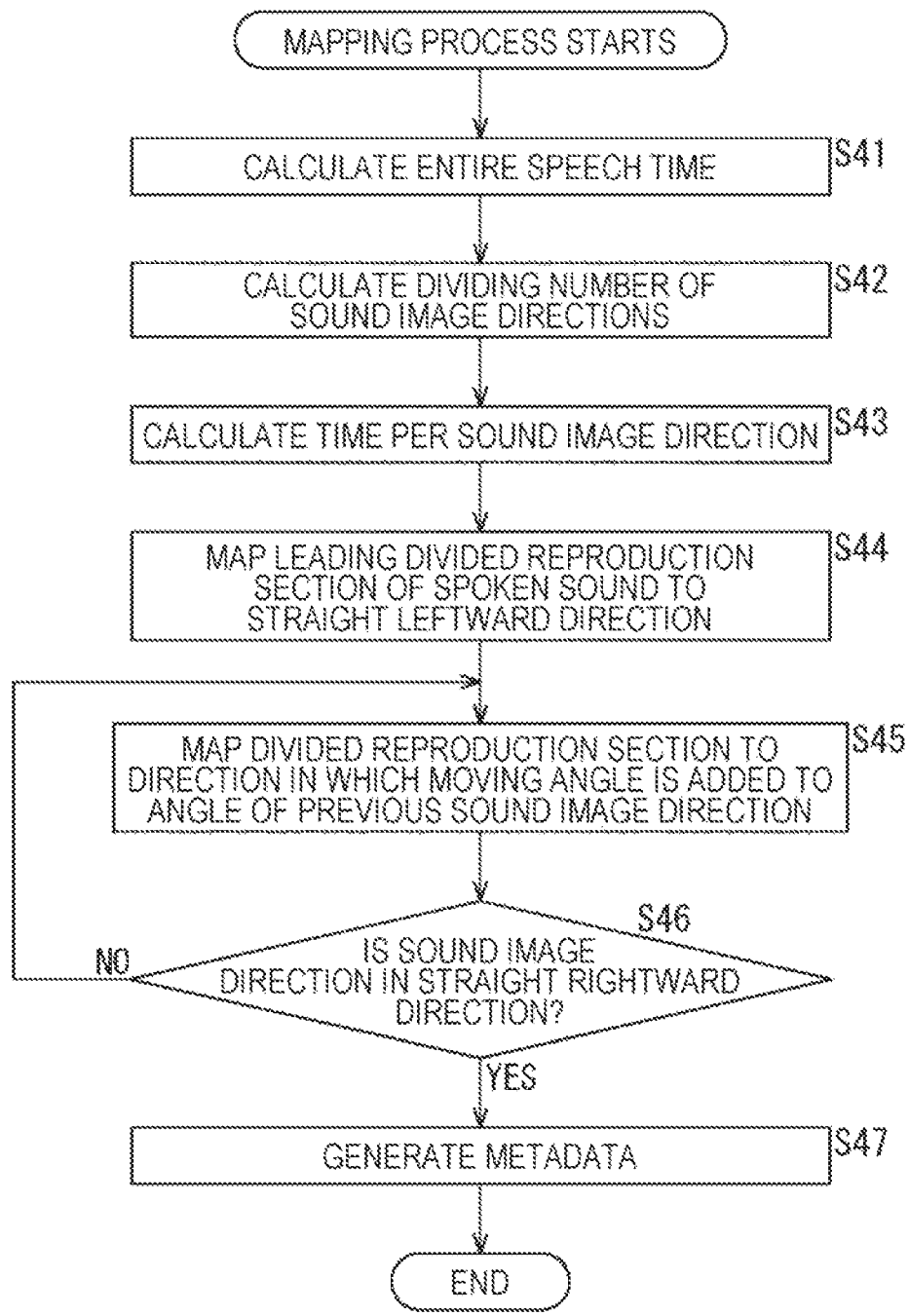
FIG. 5 is a flowchart for explaining a mapping process.

Back to the description of the flowchart of FIG. 5, in step S47, the sound image position mapping unit 23 generates metadata on the basis of the analysis result from the natural language analyzing unit 21, the spoken sound data file from the sound synthesis engine 22, and the divided reproduction section mapping result.

Figure 7:
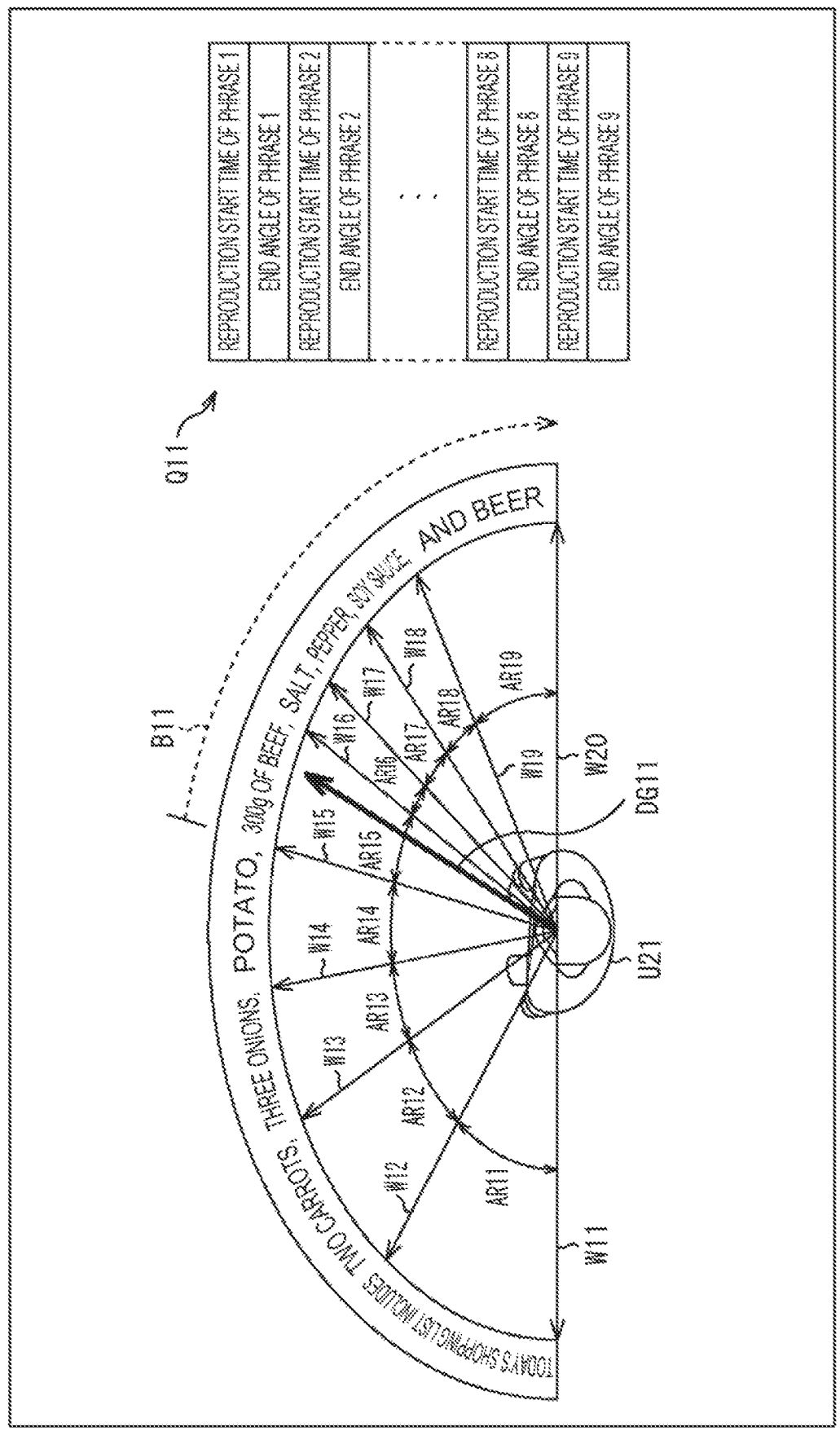
FIG. 7 is a diagram for explaining generation of metadata.

More specifically, for example, as illustrated in FIG. 7, it is assumed that the sentence of the speech text is "Today's shopping list includes two carrots, three onions, a potato, 300 g of beef, salt, pepper, soy sauce, and beer."

Furthermore, it is assumed that as a result of a natural language analysis, the sentence of the sound speech is separated into phrases of "Today's shopping list includes," "two carrots," "three onions," "a potato," "300 g of beef," "salt," "pepper," "soy sauce," and "and beer."

In such a case, the sound image orientation sound data file is generated on the basis of the sound image position information and, in a case where the spoken sound is reproduced, to the user U21 who listens to the spoken sound, the sound image moves from the left side to the right side of the user U21 as the speech proceeds, as illustrated in FIG. 7.

The sound image position mapping unit 23 specifies an area where the sound image is located during the reproduction of the phrase part as a sound image area, for each phrase of the sound speech. In other words, the direction of the sound image is divided in unit of phrases.

For example, the phrases of "Today's shopping list includes," "two carrots," "three onions," "a potato," "300 g of beef," "salt," "pepper," "soy sauce," and "and beer." are assumed to be phrases C1 to C9, respectively. Furthermore, the numbers to identify the phrases C1 to C9 are assumed to be phrase numbers 1 to 9, respectively. Note that, in a case where the phrase numbers are applied, a series of continuous numbers is applied so that the phrase number of the leading phrase is set to 1 and a larger number is applied to a later phrase, in order from the leading phrase to the last phrase of the spoken sound.

In the example of FIG. 7, as respective sound image areas of the phrases C1 to C9, sound image areas AR11 to AR19 are specified.

The sound image area AR11 is an area between a direction indicated by the arrow W11 and a direction indicated by the arrow W12.

In a similar manner, the sound image area AR12 is an area between the direction indicated by the arrow W12 and a direction indicted by the arrow W13, the sound image area AR13 is an area between the direction indicated by the arrow W13 and a direction indicated by the arrow W14, and the sound image area AR14 is an area between the direction indicated by the arrow W14 and a direction indicated by the arrow W15.

Furthermore, the sound image area AR15 is an area between the direction indicated by the arrow W15 and a direction indicated by the arrow W16, the sound image area AR16 is an area between the direction indicated by the arrow W16 and a direction indicated by the arrow W17, and the sound image area AR17 is an area between the direction indicated by the arrow W17 and a direction indicated by the arrow W18. In addition, the sound image area AR18 is an area between the direction indicated by the arrow W18 and a direction indicated by the arrow W19, and the sound image area AR19 is an area between the direction indicated by the arrow W19 and a direction indicated by the arrow W20.

Here, the directions indicated by the arrows W11 to W20 are the sound image directions at the reproduction time of the pausing point part of the phrases C1 to C9 of the spoken sound. For example, a direction indicated by the arrow W11 is the sound image direction at the reproduction time of the leading part of the phrase C1. Furthermore, for example, the direction indicated by the arrow W12 is the sound image direction at the reproduction time of the end part of the phrase C1 and the leading part of the phrase C2.

Therefore, for example, in a case where the spoken sound is reproduced and "Today's shopping list includes," which is the phrase C1, is reproduced (spoken), the sound image moves in the sound image area AR11. In other words, the sound image moves from the direction indicated by the arrow W11 to the direction indicated by the arrow W12.

More specifically, the sound image is oriented to the direction indicated by the arrow W11 in the beginning of the reproduction of the phrase C1, the sound image moves rightward as it is reproduced, and the sound image is oriented to the direction indicated by the arrow W12 in the end of the reproduction of the phrase C1.

The sound image position mapping unit 23 can specify the phrases C1 to C9 on the basis of the result of the natural language analysis.

Furthermore, the spoken sound data file includes the reproduction time information, and the sound image position mapping unit 23 can recognize the reproduction time corresponding to the pausing point of each of the phrases C1 to C9 on the basis of the reproduction time information. More particularly, the reproduction time of the leading part of each phrase is the above described phrase reproduction start time.

Furthermore, since the reproduction time corresponding to the pausing point of each phrase can be recognized, the sound image position mapping unit 23 can specify the sound image direction of the pausing point of each phrase on the basis of each divided reproduction section mapping result when the sound image position information is reproduced. In other words, in this example, the sound image position mapping unit 23 can specify the directions indicated by the arrows W11 to W20.

When the sound image directions of the pausing points of the respective phrases, which are the directions indicated by the arrows W11 to W20 are specified in this manner, the sound image position mapping unit 23 generates metadata indicated by the arrow Q11 on the basis of the result of specifying directions indicated by the arrows W11 to W20 and reproduction time information of the pausing point of each phrase.

In the metadata indicated by the arrow Q11, phrase reproduction start time information indicating the phrase reproduction start time and sound image direction in the end part of the phrase, which is phrase end angle information indicating the phrase end angle are included for each of the phrases C1 to C9.

For example, the "reproduction start time of phrase 1" in the metadata indicated by the arrow Q11 represents the phrase reproduction start time information of the phrase C1 whose phrase number is 1.

Furthermore, for example, the "end angle of phrase 1" in the metadata indicted by the arrow Q11 represents phrase end angle information that indicates an angle of the sound image direction at the reproduction time in the end part of the phrase C1, which is a separating part between the phrase C1 and phrase C2.

In a case where such metadata is generated in advance, a random access reproduction of the spoken sound becomes available. For example, it is assumed that, in the specified direction identification unit 31, a direction indicated by the arrow DG11 is specified as a specified direction specified by the user U21.

In this case, since the specified direction indicated by the arrow DG11 is a direction included in the sound image area AR15, the phrase C5 is specified by the user U21.

In the reproduction control unit 26, since the angle of the specified direction indicated by the arrow DG11 is identified as the angle between the phrase end angle of the phrase C4 and the phrase end angle of the phrase C5 by referring to the metadata indicated by the arrow Q11, the specified direction can be identified as the direction in the sound image area AR15. In other words, it can be identified that the phrase C5 is specified.

Therefore, in this case, the reproduction control unit 26 can reproduce the spoken sound from the phrase reproduction start time of the specified phrase C5 as the random access reproduction as indicated by the arrow B11.

Back to the description of flowchart of FIG. 5, when the metadata is generated in step S47 as described above and the sound image position information and metadata are obtained, the sound image position mapping unit 23 provides the sound image position information and metadata to the sound image orientation engine 24 and the mapping process ends.

Furthermore, in a case where the sound image position information and metadata are provided from the sound image position mapping unit 23 to the sound image orientation engine 24, the sound image orientation engine 24 generates sound image orientation sound data in step S14 of FIG. 4.

In this case, regarding each divided reproduction section of the sound data of the spoken sound data file, the sound image orientation engine 24 generates sound data, as sound image orientation sound data, of right and left channels by applying a phase difference by an amount of the sample numbers indicated by the phase difference information of the divided reproduction sections. With this arrangement, for example, sound image orientation sound data in two channels of right and left is obtained from monaural sound data.

Note that, in generation of the sound image orientation sound data, the sound mage may be oriented by further providing a difference of a sound volume in the right and left sound by changing amplitude of the sound data in the right and left channels, in addition to providing a phase different to the sound data in the right and left channels to orient the sound image.

As described above, the sound speech progress presentation UI system defines the sound image direction by mapping each divided reproduction section of the spoken sound and generates the sound image position information as well as the metadata. With this arrangement, the progress can be presented by properly moving the sound image in a case where the spoken sound is reproduced.

<About Random Access Reproduction Process>

Furthermore, as described above, since the sound image orientation sound data file includes metadata, a random access reproduction that starts reproducing from a leading part of any phrase of the spoken sound can be performed by using the metadata.

Figure 8:
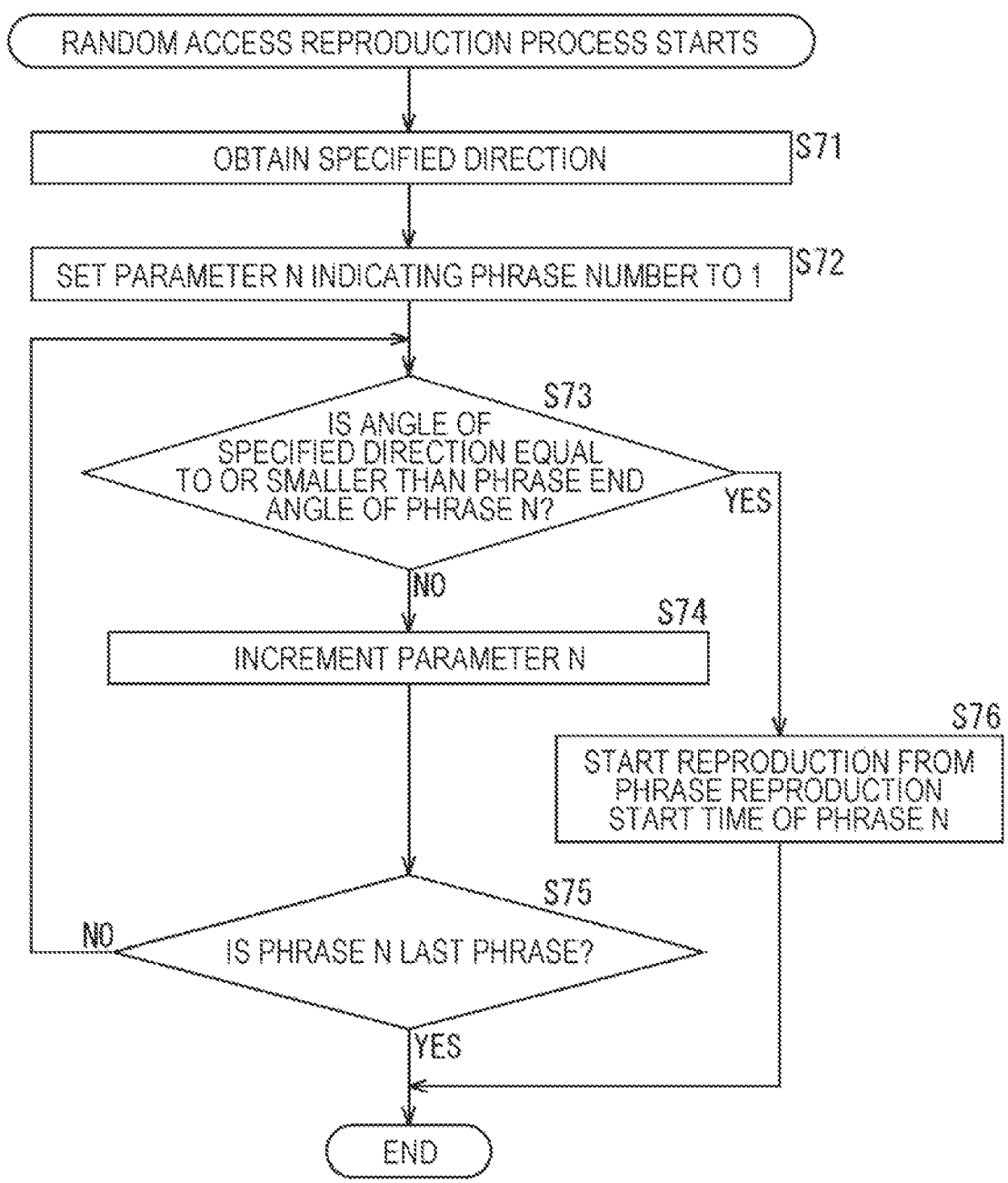
FIG. 8 is a flowchart for explaining a random access reproduction process.

In the following, the random access reproduction process by the sound speech progress presentation UI system will be described with reference to the flowchart of FIG. 8.

In step S71, the specified direction identification unit 31 obtains a specified direction specified by the user.

For example, the user specifies the specified direction by pointing a desired direction with a finger or facing user's face toward a desired direction. Then, the specified direction identification unit 31 identifies the specified direction specified by the user by image recognition or the like on the basis of an image obtained from a camera or a sensing result obtained from a sensor. The sound reproducing operation unit 28 outputs an operation signal including information indicating an angle of the specified direction obtained in this manner to the reproduction control unit 26. Here, the sound image orientation sound data file is specified by the operation signal as needed.

In step S72, the reproduction control unit 26 sets a value of a parameter N, which indicates a phrase number of a phrase as a process target, to be 1. Note that, the phrase of the phrase number indicated by the parameter N is also referred to as a phrase N.

In step S73, the reproduction control unit 26 determines whether or not the angle of the specified direction included in the operation signal provided from the sound reproducing operation unit 28 in step S71 is equal to or smaller than a phrase end angle of the phrase N.

In other words, the reproduction control unit 26 reads sound image orientation sound data file to be processed in the random access reproduction from the sound image orientation sound data file recording unit 25. Then, the reproduction control unit 26 identifies the phrase end angle of the phrase N by referring to the metadata in the sound image orientation sound data file and determines whether the angle of the specified direction is equal to or smaller than the phrase end angle of the phrase N by comparing the phrase end angle and the angle of the specified direction.

In a case where the angle of the specified direction is not equal to or smaller than the phrase end angle of the phrase N, that is, that the specified direction is located in the right side of the user compared to the phrase end angle of the phrase N, in step S73, the process proceeds to step S74.

In step S74, the reproduction control unit 26 increments the value of the parameter N by one.

In step S75, the reproduction control unit 26 determines whether or not a phrase N indicated by a new parameter N is a last phrase.

The last phrase in this case is a last phrase of the phrases of the spoken sound based on the sound image orientation sound data included in the sound image orientation sound data file. For example, the last phrase can be identified from the number of pieces of phrase reproduction start time information or the number of pieces of phrase end angle information included in the metadata.

In a case where it is determined that the phrase is the last phrase in step S75, the random access reproduction process ends since the specified direction has not been properly specified.

On the other hand, in a case where it is determined that the phrase is not the last phrase in step S75, the process returns to step S73 and the above described processes are repeated.

Furthermore, in a case where it is determined that the angle of the specified direction is equal to or smaller than the phrase end angle of the phrase N in step S73, the process proceeds to step S76.

In this case, since it is recognized that the specified direction specified by the user is a direction within the sound image area of the phrase N, the phrase N is specified by the user.

In step S76, the reproduction control unit 26 identifies a phrase reproduction start time of the phrase N by referring to the metadata in the sound image orientation sound data file and starts the reproduction of the spoken sound from the phrase reproduction start time of the phrase N by providing the sound image orientation sound data subsequent to the phrase reproduction start time to the sound reproducing device 27 and controlling to reproduce the sound data. The sound reproducing device 27 reproduces the spoken sound on the basis of the sound image orientation sound data provided from the reproduction control unit 26.

When the spoken sound is reproduced from the leading part of the phrase specified by the user in this manner, the random access reproduction process ends.

As described above, the sound speech progress presentation UI system identifies a phrase corresponding to the specified direction specified by the user and starts to reproduce the spoken sound from a leading part of the phrase. In the sound speech progress presentation UI system, the random access reproduction is realized since the phrase reproduction start time information and phrase end angle information are recorded as metadata. With this arrangement, usability by the user can be improved.

Second Embodiment

<About Sound Image Orientation>

Furthermore, the above description has described an example in which the entire reproduction section of a spoken sound is equally divided into divided reproduction sections, and each divided reproduction section is mapped in a sound image direction. However, in addition to this example, mapping may be performed on the basis of a dependency structure of phrases in the sentence of the speech text obtained as a result of a natural language analysis.

More specifically, for example, it is assumed that the speech text is a sentence related to a shopping list and, as a result of a natural language analysis, a plurality of items to be purchased during shopping, which are presentation items to be presented to the user with a speech, are detected as list information. Here, the items to be purchased, as the list information, are assumed to be items or the like included in respective phrases of a plurality of object cases of the same predicate phrase.

In such a case, the sound speech progress presentation UI system sets the number of list information included in the sentence as a dividing number of the sound image direction and sets a reproduction section of speech words including the list information, which is a reproduction section including speech of the presentation item, as a divided reproduction section.

With this arrangement, in the reproduction of the spoken sound, a sound image is continuously oriented to a same position (direction) in the reproduction section of the speech including the list information. In other words, the sound image position is divided for each reproduction section including speech of the list information (item), and the sound image moves so that a sound image orientation corresponding to the number of items, which is the number of pieces of the list information, can be performed.

Figure 9:
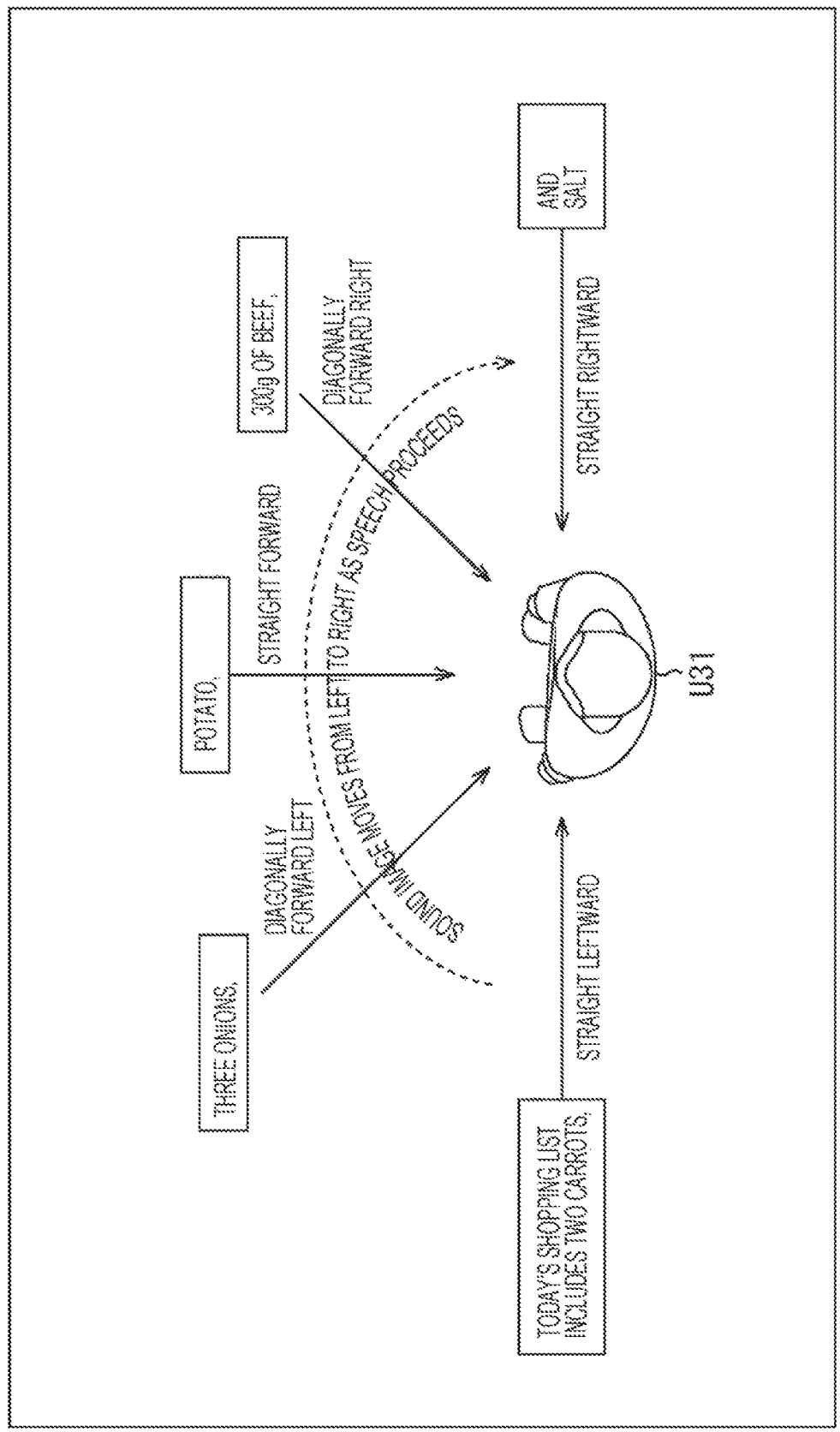
FIG. 9 is a diagram for explaining movement of a sound image according to progress.

As a specific example, it is assumed that the sentence of the speech text is "Today's shopping list includes two carrots, three onions, a potato, 300 g of beef, and salt." as illustrated in FIG. 9 for example.

Furthermore, as a result of a natural language analysis, it is identified that "two carrots," "three onions," "a potato," "300 g of beef," and "salt." are respectively included as the list information, which is the presentation items of shopping.

In this case, the sound image position mapping unit 23 sets a section of a spoken sound including one or more phrases including the phrase of the identified item (list information) as one divided reproduction section. Here, for example, the one divided reproduction section is made to always include a speech of one item.

In this example, the each section of "Today's shopping list includes two carrots," "three onions," "a potato," "300 g of beef," and "and salt." is regarded as one divided reproduction section. Note that the position of separating each divided reproduction section of all sections in the spoken sound can be identified from the reproduction time information included in the spoken sound data file.

By arranging a single divided reproduction section to include a speech of an item corresponding to one piece of list information, the sound image direction, which is a direction of a sound image orientation position seen from a user U31 is set to be different for each item.

In this example, in a case of the speech of the first divided reproduction section, "Today's shopping list includes two carrots," the sound image is oriented to the straight leftward direction as seen from the user U31. In this case, the sound image is kept oriented to the straight leftward direction while the divided reproduction section is being reproduced.

Furthermore, when the following divided reproduction section, "three onions" is reproduced, the sound image is oriented to the diagonally forward left of the user U31, and then, when the following divided reproduction section "a potato" is reproduced, the sound image moves further rightward to the direction of the straight forward of the user U31.

Furthermore, when the following divided reproduction section, "300 g of beef," is reproduced, the sound image is oriented to the diagonally forward right of the user U31 and, when the last divided reproduction section, "and salt," is reproduced, the sound image is oriented to the straight rightward direction of the user U31, and then the reproduction of the spoken sound ends.

By moving the sound image in unit of items, that is, by presenting the progress of the sound speech in unit of items, in this manner, the speech content can be presented to the user so as to be easily memorized since the user can associate the items with the sound image directions.

Furthermore, also in the case where the number of the presentation items is assumed to be the dividing number of the sound image direction, the random access reproduction can be realized in unit of items by generating the metadata as in the case described with reference to FIG. 7.

In other words, for example, it is assumed that the speech text same as that in the example illustrated in FIG. 9 is provided and the respective sections of "Today's shopping list includes two carrots," "three onions," "a potato," "300 g of beef," and "and salt." are set as divided reproduction sections.

Figure 10:
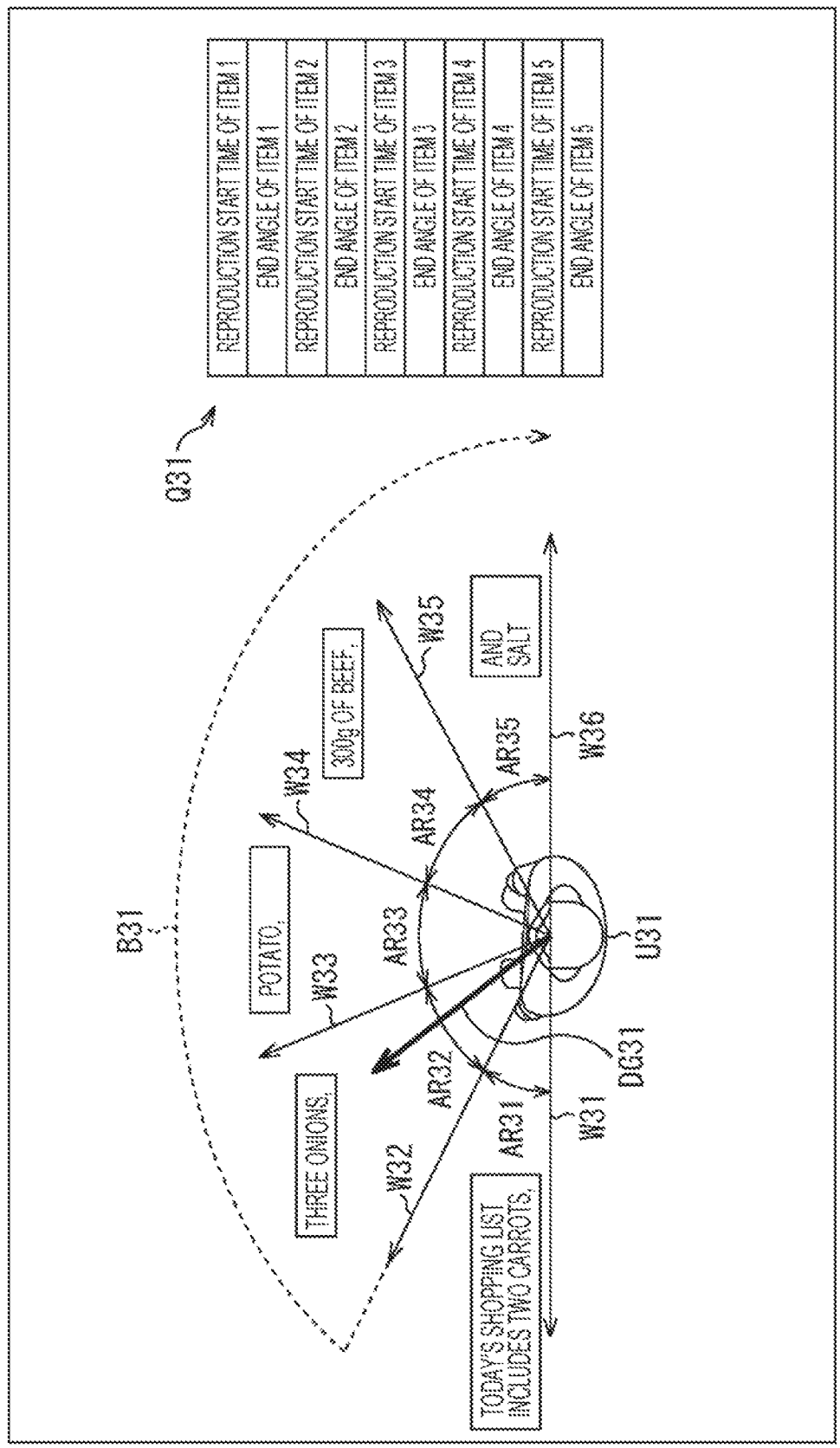
FIG. 10 is a diagram for explaining generation of metadata.

In such a case, for example, the metadata is generated as illustrated in FIG. 10. Note that, in FIG. 10, a part corresponding to that in the FIG. 9 is applied with the same reference numeral and explanation thereof will be omitted.

In the example illustrated in FIG. 10, the direction of the sound image is equally divided by the number of items as the list information and set as sound image areas AR31 to AR35.

In other words, the sound image position mapping unit 23 specifies the sound image areas AR31 to AR35 including directions that the sound images are oriented for each item (list information) detected in a speech text when the divided reproduction sections including the items are reproduced.

For example, the item "two carrots" included in the divided reproduction section including the phrase "Today's shopping list includes" and the phrase "two carrots" is assumed to be item IT1.

Furthermore, the item "three onions," "a potato," "300 g of beef," and "and salt." included in the divided reproduction sections including the phrases "three onions," "a potato," "300 g of beef," and "and salt." are assumed to be items IT2 to IT5, respectively.

Furthermore, it is assumed that the numbers to identify the items IT1 to IT5 are item numbers 1 to 5. Note that, in a case where the item numbers are applied, a series of continuous numbers is applied so that the item number of the leading item is set to 1 and a larger item number is applied to a later item, in order from the item included in the leading divided reproduction section to the item included in the last divided reproduction section of the spoken sound.

In the example of FIG. 10, as the sound image areas of the respective items IT1 to IT5, which are the sound image areas of the divided reproduction sections including speech of the respective items IT1 to IT5, the sound image areas AR31 to AR35 are identified.

The sound image area AR31 is an area between a direction indicted by the arrow W31 and a direction indicated by the arrow W32.

In a similar manner, the sound image area AR32 is an area between the direction indicated by the arrow W32 and a direction indicated by the arrow W33, and the sound image area AR33 is an area between the direction indicated by the arrow W33 and a direction indicated by the arrow W34. Furthermore, the sound image area AR34 is an area between the direction indicated by the arrow W34 and a direction indicated by the arrow W35, and the sound image area AR35 is an area between the direction indicated by the arrow W35 and a direction indicated by the arrow W36.

Here, the direction indicated by the arrow W31 is a sound image direction which is a mapping destination of the divided reproduction section including the speech of the first item IT1, and the direction indicated by the arrow W36 is a sound image direction as mapping destination of the divided reproduction section including the speech of the last item IT5.

Furthermore, for example, the direction indicated by the arrow W32 is a direction between the sound image direction as a mapping destination of the divided reproduction section including the first item IT1 and a sound image direction as a mapping source of the divided reproduction section including speech of the second item IT2. More specifically, for example, the direction in the middle of the sound image direction as the mapping destination of the divided reproduction section including speech of the item IT1 and the sound image direction as the mapping destination of the divided reproduction section including the second item IT2 is assumed to be the arrow W32.

The direction indicated by the arrow W33 is a direction between a sound image direction as a mapping destination of the divided reproduction section including the speech of the second item IT2 and the sound image direction as the mapping destination of the divided reproduction section including the speech of the third item IT3.

Furthermore, the direction indicated by the arrow W34 and the direction indicated by the arrow W35 are also directions between sound image directions as the mapping destinations of two continuous divided reproduction sections, as in the direction indicated by the arrow W33.

In the following, among the directions as borders of the sound image areas of the items, a direction further in the right, which is a direction having a larger angle, is also referred to as a direction of an end part of the sound image area. For example, regarding the sound image area AR31 of the item IT1, the direction indicated by the arrow W32 is the direction of an end part of the sound image area AR31.

The sound image position mapping unit 23 can identify the items IT1 to IT5 on the basis of the result of a natural language analysis.

Furthermore, the spoken sound data file includes reproduction time information, and the sound image position mapping unit 23 can recognize respective reproduction times of the pausing point of the divided reproduction sections respectively including the items IT1 to IT5 on the basis of the reproduction time information.

Specifically, in the following, the reproduction time of the leading part of the divided reproduction section including a speech of each item is also referred to as item reproduction start time.

Furthermore, the sound image position mapping unit 23 can identify directions of the borders of the sound image areas of each item (divided reproduction section), which are the directions indicated by the arrows W31 to W36, on the basis of the result of mapping the divided reproduction section of each item to the sound image direction.

In a case that the item reproduction start time of each item and the directions of the borders between the sound image areas of each item are identified in this manner, the sound image position mapping unit 23 generates metadata indicated by the arrow Q31 on the basis of the identification results.

The metadata indicated by the arrow Q31 includes item reproduction start time information indicating item reproduction start time and item end angle information indicating an angle of a direction of an end part of the sound image area of the item, respectively for the items IT1 to IT5.

For example, the "reproduction start time of item 1" in the metadata indicated by the arrow Q31 is item reproduction start time information indicating item reproduction start time of the item IT1 whose item number is 1.

Furthermore, for example, "end angle of item 1" in the metadata indicated by the arrow Q31 is item end angle information indicating an angle of a direction of an end part of the sound image area AR31 of the item IT1, which is an angle of a direction of a border between the sound image area AR31 and sound image area AR32.

In the following, the angle of a direction of the end part of the sound image area of the item is also referred to as an item end angle.

In a case where such metadata is generated in advance, a random access reproduction of the spoken sound becomes available. For example, it is assumed that the specified direction identification unit 31 identifies the direction indicated by the arrow DG31 as a specified direction specified by a user U31.

In this case, since the specified direction indicated by the arrow DG31 is a direction included in the sound image area AR32, the item IT2 is specified by the user U31.

The reproduction control unit 26 can identify that an angle of the specified direction indicated by the arrow DG31 is an angle between the item end angle of the item IT1 and the item end angle of the item IT2 by referring to the metadata indicated by the arrow Q31. With this arrangement, it is identified that the specified direction is a direction within the sound image area AR32. In other words, it is assumed to be identified that the divided reproduction section of the item IT2 is specified.

Therefore, in this case, the reproduction control unit 26 can reproduce the spoken sound from the item reproduction start time of the divided reproduction section of the identified item IT2 as the random access reproduction, as indicated by the arrow B31.

<About Mapping Process>

Next, a mapping process, which is performed in a case where a reproduction section of a speech including list information, which is an item, is used as divided reproduction sections as described above, will be described.

Figure 11:
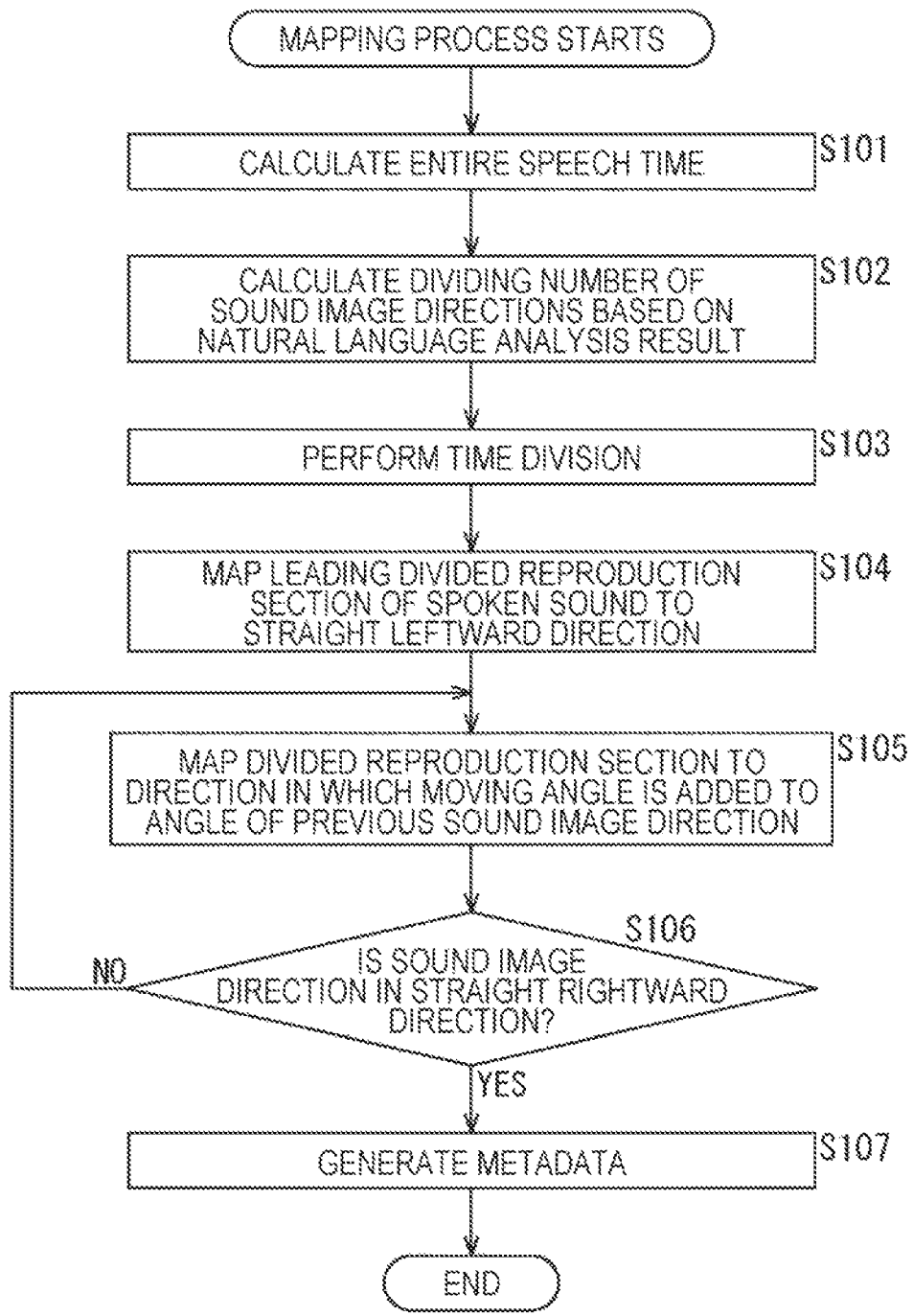
FIG. 11 is a flowchart for explaining a mapping process.

In other words, the mapping process corresponding to a process in step S13 in FIG. 4, which is performed by the sound image position mapping unit 23, will be described with reference to the flowchart of FIG. 11.

Note that, since the process in step S101 is similar to the process in step S41 of FIG. 5, the explanation thereof will be omitted.

In step S102, the sound image position mapping unit 23 calculates a dividing number of the sound image direction on the basis of the result of the natural language analysis from the natural language analyzing unit 21.

For example, the sound image position mapping unit 23 detects a number of phrases of a plurality of target cases related to a same predicate phrase on the basis of the natural language analysis result as a number of list information pieces or a number of items, and sets the detected number of items as a dividing number of sound image directions.

In step S103, the sound image position mapping unit 23 performs a time division of the entire reproduction section of the sound data of the spoken sound with the dividing number obtained in step S102, on the basis of the spoken sound data file from the sound synthesis engine 22.

For example, the sound image position mapping unit 23 identifies the reproduction time of pausing point of the phrase including the list information, which is the item, on the basis of the reproduction time information included in the spoken sound data file and divides the entire reproduction section of the spoken sound at the pausing points. Here, regarding a phrase which does not include an item, the division of the entire reproduction section is performed on the basis of the dependency structure of the phrases so that the phrase is included in the same divided reproduction section with an adjacent phrase including an item. With this arrangement, each of the plurality of sections divided from the entire reproduction section is set as a divided reproduction section including one item, respectively.

When the entire reproduction section of the spoken sound is divided into reproduction sections of each item in this manner, the processes in steps S104 to S106 are then performed and sound image position information is generated; however, since these processes are similar to the processes in steps S44 to step S46 of FIG. 5, the explanation thereof will be omitted.

Note that, in steps S104 to S106, a sample number d/(c/f), which indicates a phase difference of sound data in the right and left channels needed to orient the sound image to the straight leftward direction is obtained on the basis of the sampling rate of the sound data and set as phase difference information regarding the straight leftward direction.

Furthermore, a moving angle of the sound image is calculated by calculating a 180/(dividing number−1) degrees from the dividing number of the sound image direction, and the divided reproduction sections are mapped so that the sound image is shifted rightward in units of moving angles. In this case, the phase difference needed to orient the sound image to each sound image direction can be obtained on the basis of the phase difference needed to orient the sound image to the straight leftward direction.

Furthermore, in a case where it is determined as the straight rightward direction in step S106, since all divided reproduction sections have been processed and sound image position information has been obtained, the process proceeds to step S107.

In step S107, the sound image position mapping unit 23 generates metadata on the basis of the analysis result from the natural language analyzing unit 21, the spoken sound data file from the sound synthesis engine 22, and the divided reproduction section mapping result.

For example, the sound image position mapping unit 23 identifies reproduction time of the pausing point of the divided reproduction section of each item on the basis of the natural language analysis result and the reproduction time information in the spoken sound data file, and generates item reproduction start time information included in the metadata.

Furthermore, the sound image position mapping unit 23 identifies a direction of borders of the sound image areas on the basis of the result of mapping the divided reproduction sections of each item to the sound image directions, and generates the item end angle information included in the metadata. As a result, the metadata including the item reproduction start time information and item end angle information of each item is obtained.

In a case where the sound image position information and the metadata are obtained as described above, the sound image position mapping unit 23 provides the sound image position information and metadata to the sound image orientation engine 24 and the mapping process ends.

As described above, the sound speech progress presentation UI system calculates a dividing number of the sound image direction on the basis of the natural language analysis result and divides the entire reproduction section of the spoken sound into the dividing number of divided reproduction sections. Furthermore, the sound speech progress presentation UI system maps each of the divided reproduction sections to define the sound image directions, and generates the sound image position information as well as the metadata. With this arrangement, the progress can be presented by properly moving the sound image in a case where the spoken sound is reproduced.

<About Random Access Reproduction Process>

Next, a random access reproduction process, which is performed in a case where a reproduction sections including a speech of an item is used as a divided reproduction section, will be described.

In other words, in the following, a random access reproduction process by the sound speech progress presentation UI system will be described with reference to the flowchart of FIG. 12. Note that, since the process in step S131 is similar to the process in step S71 of FIG. 8, the explanation thereof will be omitted.

In step S132, the reproduction control unit 26 sets a value of a parameter N, which indicates the item number as a process target, to 1. Note that, in the following, the item of the item number indicated by the parameter N is also referred to as an item N.

In step S133, the reproduction control unit 26 determines whether or not an angle of the specified direction included in the operation signal provided from the sound reproducing operation unit 28 in step S131 is equal to or smaller than an item end angle of the item N.

In other words, the reproduction control unit 26 reads sound image orientation sound data file to be processed in the random access reproduction from the sound image orientation sound data file recording unit 25. Then, the reproduction control unit 26 identifies the item end angle of the item N by referring to the metadata in the sound image orientation sound data file, and determines whether the angle of the specification direction is equal to or smaller than the item end angle of the item N by comparing the item end angle with the angle of the specified direction.

In a case where the angle of the specified direction is not equal to or smaller than the item end angle of the item N, which means that the specified direction is in the right side of the item end angle of the item N as seen from the user, in step S133, the process proceeds to step S134.

In step S134, the reproduction control unit 26 increments the value of the parameter N by one.

In step S135, the reproduction control unit 26 determines whether or not the item N indicated by a new parameter N is a last item.

The last item here is an item of a temporally last divided reproduction section in the sound image orientation sound data. For example, the last item can be identified from the number of pieces of item reproduction start time information or the number of pieces of item end angle information included in the metadata.

In a case where it is determined that the item N is a last item in step S135, since the specified direction has not been properly specified, the random access reproduction process ends.

On the other hand, in a case where it is determined that the item N is not the last item step S135, the process returns to step S133 and the above described processes are repeated.

Furthermore, in a case where it is determined that the angle of the specified direction is equal to or smaller than the item end angle of the item N in step S133, the process proceeds to step S136.

In this case, since it can be recognized that the specified direction specified by the user is a direction within the sound image area of the item N, the item N is specified by the user.

In step S136, the reproduction control unit 26 identifies item reproduction start time of the item N by referring to the metadata in the sound image orientation sound data file and starts to reproduce the spoken sound from the item reproduction start time of the item N by providing the sound image orientation sound data subsequent to the item reproduction start time to the sound reproducing device 27 to reproduce the data. The sound reproducing device 27 reproduces the spoken sound on the basis of the sound image orientation sound data provided from the reproduction control unit 26.

When the spoken sound is reproduced from the leading part of the divided reproduction section of the item specified by the user in this manner, the random access reproduction process ends.

As described above, the sound speech progress presentation UI system identifies an item corresponding to the specified direction specified by the user and starts to reproduce the spoken sound from a leading part of the divided reproduction section of the item. In the sound speech progress presentation UI system, a random access reproduction can be realized by recording the item reproduction start time information and item end angle information are recorded as metadata. With this arrangement, usability by the user can be improved.

First Modification of Second Embodiment

<About Sound Image Area>

Furthermore, according to the second embodiment, an example in which sound image areas having the same width are defined for the respective items has been described; however, the width of the sound image area may be defined according to a level of importance of the item. In other words, mapping can be performed as changing resolution of the angle of the sound image orientation according to a level of importance of the item. In this case, as the level of importance of the item is higher, a wider sound image area is allocated.

Figure 13:
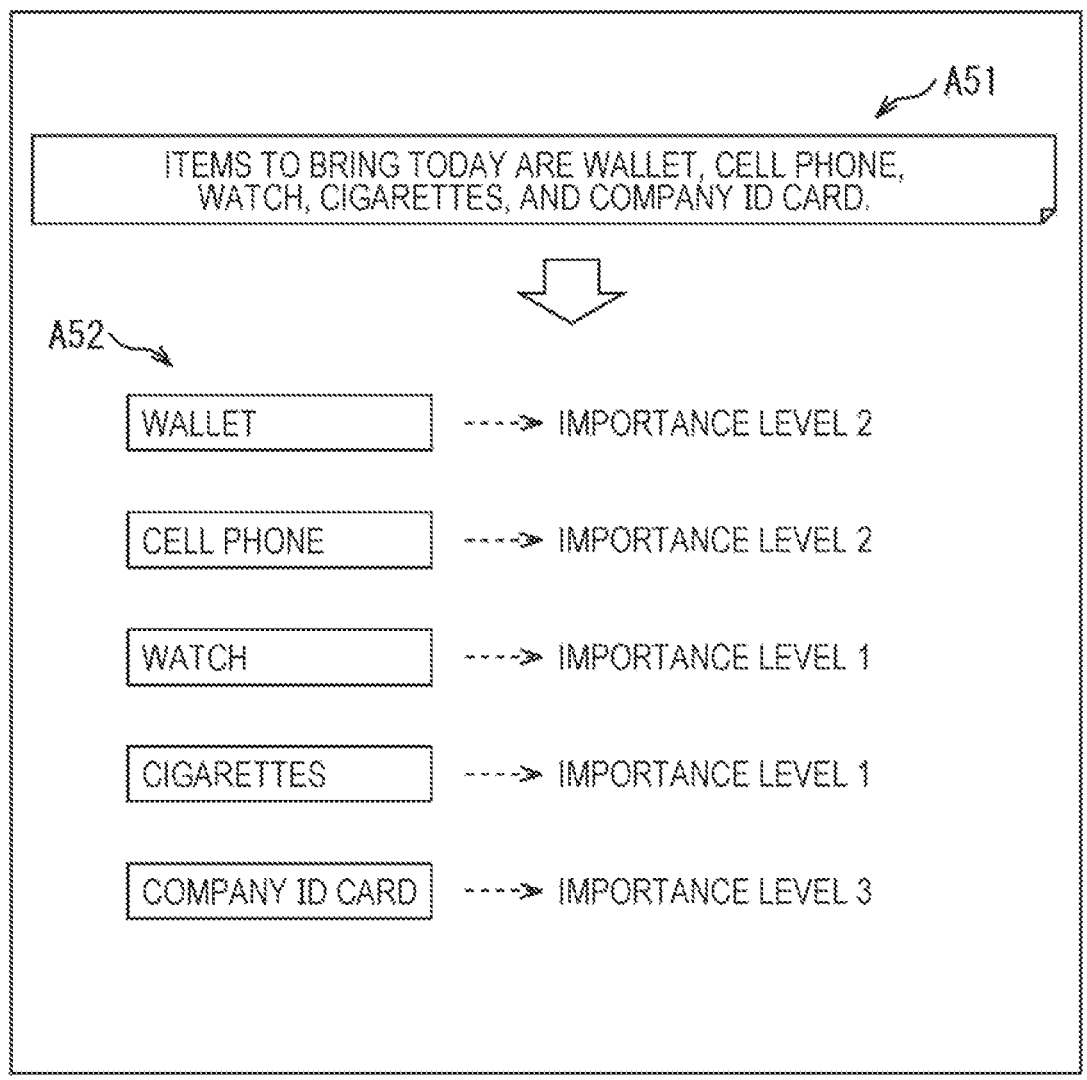
FIG. 13 is a diagram for explaining levels of importance.

More specifically, for example, as indicated by the arrow A51 in FIG. 13, it is assumed that a sentence of a speech text is "Items to bring today are wallet, cell phone, watch, cigarettes, and company ID card."

Furthermore, as a result of a natural language analysis of this speech text, as indicated by the arrow A52, it is assumed that "wallet," "cell phone," "watch," "cigarettes," and "company ID card" are detected as items.

In this case, the sound image position mapping unit 23 defines a level of importance for each of the items. Here, the level of importance indicates that an item is more important as a value of the level of importance is larger or the level of importance is higher.

In this example, to each item of "wallet," "cell phone," "watch," "cigarettes," and "company ID card," importance level 2, importance level 2, importance level 1, importance level 1, and importance level 3 are defined respectively.

Here, the level of importance of each item may be defined by a user or the like in advance or may be dynamically defined on the basis of a natural language analysis result, for example.

Furthermore, for example, the sound image position mapping unit 23 may obtain schedule information such as a list of things that the user needs to do or a list of user's schedules, that is, a so-called to do list and define a level of importance of items on the basis of the schedule information. More specifically, for example, in a case where information indicating a child's birthday or the like is included in schedule information for an immediate coming week, a level of importance for "present," which is detected as an item, can be set to the highest.

In a case where the level of importance of each item is set as illustrated in FIG. 13, for example, the sound image position mapping unit 23 determines a width of each sound image area for the items of "wallet," "cell phone," "watch," "cigarettes," and "company ID card", as follows.

In other words, firstly, the sound image position mapping unit 23 adds (integrates) values of the importance levels of all items and calculates an angle of a minimum resolution with respect to an entire angle, 180 degrees, by dividing the 180 degrees which is a range of a possible angle of the sound image direction, with the added value obtained as a result.

In this example, the values of the importance levels of each item of "wallet," "cell phone," "watch," "cigarettes," and "company ID card," 2, 2, 1, 1, and 3 are added and an added value "9" is calculated. Then, 180 degrees is divided by the added value and as an angle of a minimum resolution, 20 (=180/9) degrees is calculated.

The sound image position mapping unit 23 calculates an angle of a width of the sound image area of each item by multiplexing the value of importance level of each item with the 20 degrees, which is an angle of the minimum resolution obtained in this manner and maps a divided reproduction section including a speech of each item according to the calculation result.

For example, in the example illustrated in FIG. 13, since the respective importance levels of the items "wallet" and "cell phone" are "2," the angles of the width of the sound image areas of those items are set to 40 (=2×20) degrees.

Furthermore, since the respective importance levels of the items "watch" and "cigarettes" are "1," the angles of the width of the sound image areas of those items are set to 20 (=1×20) degrees and, since the importance level of the item "company ID card" is "3," the angle of the width of the sound image area of the item is set to 60 (=3×20) degrees.

Figure 14:
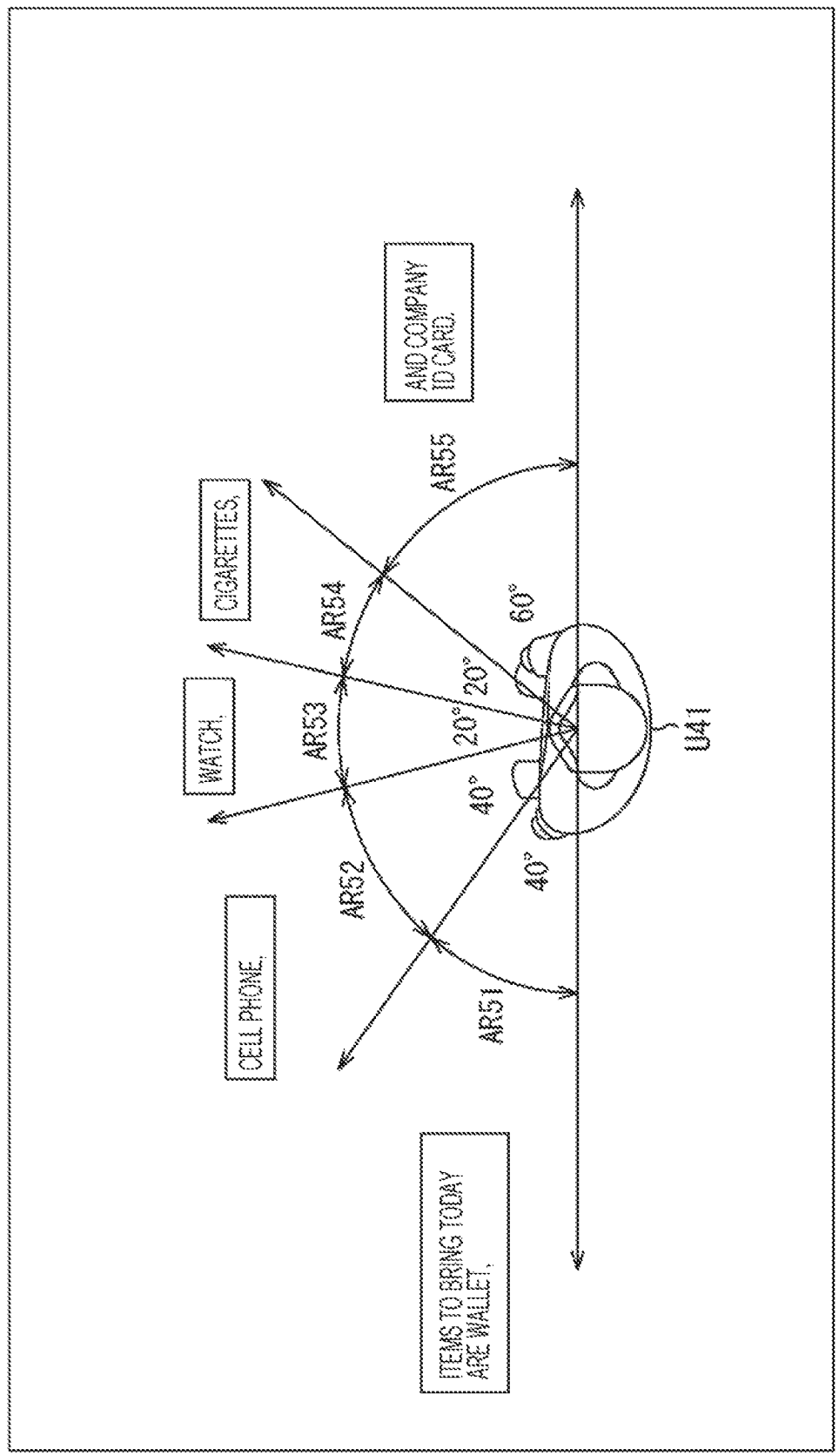
FIG. 14 is a diagram for explaining sound image area corresponding to the levels of importance.

In a case where the width of the sound image area of each item is defined in this manner, for example, mapping of each divided reproduction section is performed as illustrated in FIG. 14. In other words, to the divided reproduction section of each item, a sound image area having a defined width is allocated. Here, the allocation is performed so that the sound image areas do not overlap with one another.

In the example illustrated in FIG. 14, regarding the sentence of the speech text, "Items to bring today are wallet, cell phone, watch, cigarettes, and company ID card," sections including speeches of the respective spoken sounds "Items to bring today are wallet," "cell phone," "watch," "cigarettes," and "and company ID card." are set as divided reproduction sections.

Then, as the sound image areas of the respective divided reproduction sections including "Items to bring today are wallet," "cell phone," "watch," "cigarettes," and "and company ID card," sound image areas AR51 to AR55 are defined, respectively.

For example, the sound image area AR51 as the divided reproduction section of the part "Items to bring today are wallet" including the item "wallet" has a range of a width of 40 degrees.

Furthermore, for example, the sound image area AR55 as the divided reproduction section of the part "and company ID card." including the item "company ID card" has a range of a width of 60 degrees.

In this case, the sound image direction to which each divided reproduction section is mapped can be any direction as long as the direction is included in the sound image area of the divided reproduction sections as seen from a user U41.

More specifically, for example, a direction in a center of the sound image of the divided reproduction section may be set as the sound image direction of the divided reproduction section.

In this case, for example, the sound image direction of the divided reproduction section of the item "wallet," which is located in the most left side as seen from the user U41, is set to a direction of −70 degrees, which is a direction in a center of the sound image area AR51 of the divided reproduction section.

Note that, the sound image direction of a temporally first divided reproduction section may be set to a straight leftward direction as seen from the user U41 and the sound image direction of a temporally last divided reproduction section may be set to a straight rightward direction as seen from the user U41.

In a case where the sound image area is defined according to the level of importance of the item as described above, in step S103 of the mapping process described with reference to FIG. 11, a sound image area is defined in addition to time division of the entire reproduction section into divided reproduction sections. In other words, the sound image position mapping unit 23 defines the level of importance of each item, that is, each divided reproduction section, and also defines a width of the sound image area of each divided reproduction section on the basis of the level of importance.

Then, in steps S104 to S106, on the basis of the angle (width) of the sound image area of each divided reproduction section, a process target divided reproduction section is mapped to a sound image direction. In this case, a moving angle is obtained for each divided reproduction section on the basis of the angle (width) of the sound image area of each divided reproduction section.

By defining the sound image area according to the level of importance of the item as described above, a wider sound image area can be set for a more important item. As a result, for example, in a random access reproduction or the like, a more important item can be more easily specified by the user.

Figure 12:
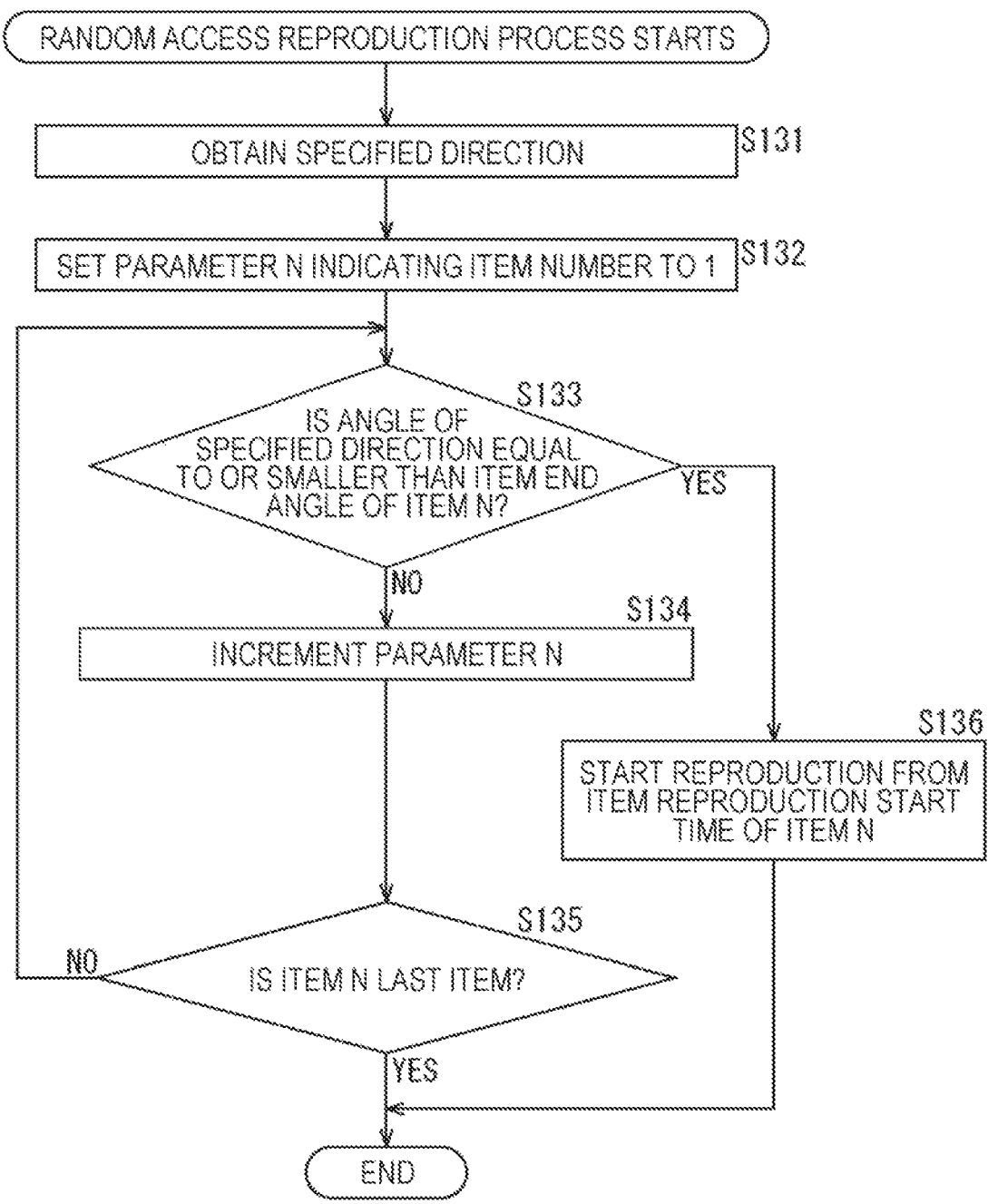
FIG. 12 is a flowchart for explaining a random access reproduction process.

Note that, in a random access reproduction, a random access reproduction process described with reference to FIG. 12 is executed.

Furthermore, for example, in a case where a user's schedule list or the like is presented with a spoken sound, a divided reproduction section corresponding to each schedule may be mapped according to the time of the schedule.

In such a case, mapping is performed to a direction defined on the basis of the time of the schedule. For example, a schedule in the morning, which is a divided reproduction section of the schedule in the morning is mapped in a straight leftward direction, a schedule in daytime is mapped to a straight forward direction, and a schedule in the evening is mapped to a straight rightward direction. In this case, the user can easily recognize aurally in which time of the day the spoken schedule is scheduled according to the sound image position of the spoken sound.

Furthermore, for example, as a spoken sound, a speech presenting a plurality of news topics is reproduced using different sound image directions and, in a case where a user specifies a specified direction, a speech of more detailed news script of the topic corresponding to the specified direction may be reproduced.

In such a case, a section of one new topic in the spoken sound is set as one divided reproduction section, and each divided reproduction section is mapped to a different sound image direction. Furthermore, as metadata, data including information indicating divided reproduction sections, which are topics, end angle information of the topics, and information indicating recording destination of the sound data of the more detailed news manuscript of the topic is generated. With this arrangement, as in the case of the above described random access reproduction, a speech of detailed news manuscript of any topic selected by the user can be selectively reproduced.

Furthermore, mapping of a spoken sound to a sound image position, which is a sound image direction is not limited to mapping to a relative direction with respect to an orientation of user's face and may be performed by mapping to an absolute direction in a space. In this case, for example, the specified direction identification unit 31 may detect an orientation of user's face, a position of a real object, or the like and use the detection result for a spoken sound reproducing control or a sound image orientation.

For example, in a reproduction environment that a spoken sound is reproduced in a speaker system including a plurality of speakers, it is particularly effective to map a divided reproduction section to an absolute direction in a space, in a case where a plurality of users listen to the speech at the same time.

Furthermore, for example, a position of a real object in an absolute space may be recognized by a camera or the like included in the specified direction identification unit 31 for example, and a sound image of the speech is oriented to the real object and the item of the speech and the real object are associated to help the user to memorize the information.

Furthermore, for example, the specified direction identification unit 31 may detect an orientation of user's face and the reproduction of the spoken sound may be controlled according to the orientation of the face. In this case, for example, a control for starting to reproduce the spoken sound prior to a currently reproduced spoken sound may be performed in a case where the user faces to the left side of the user, for example.

Furthermore, the sound image direction of the spoken sound may be moved in a front-back direction, a vertical direction, or the like according to the reproduction environment such as a surround system, in addition to a right-left direction, and the speech progress may be presented by moving the sound image from any direction to another direction.

Third Embodiment

Another Example of Progress Presentation

Furthermore, the above description has described a case that progress of the sound speech is presented by moving the sound image from one direction to another direction; however, in addition to moving the sound image, a progress presentation can be performed with any sound output as long as the progress can be presented by a method using sense of hearing.

For example, as the progress presentation of speech, the progress of the speech may be aurally presented without using a sound image, by reproducing a music, that the user is used to or familiar with, having reproduction time substantially the same as the reproduction time of the spoken sound as a background sound of the spoken sound.

In this case, the progress of the spoken sound reproduction is presented by using the background sound different from the spoken sound. In other words, by reproducing a background sound that presents progress the spoken sound reproduction while reproducing the spoken sound, a sound output that expresses progress of spoken sound reproduction can be performed.

Note that, in addition to a piece of music, the background sound can be a countdown sound that counts down remaining time before speech reproduction ends, a sound or an effective sound that notifies remaining time before the speech reproduction ends or a progress rate (a percentage or the like, for example) of the speech at predetermined intervals, or the like.

In the following, a sound speech obtained from a speech text, which is a speech including main information to be informed to the user as speech content is also referred as an object speech. Furthermore, a sound, which is different from the object speech and is used to aurally present progress of the object speech to the user, is also referred to as a background sound.

For example, in a case where object speech progress is presented to the user by reproducing a background sound together with the sound of the object speech, a piece of music that the user is familiar with, a famous piece of music that is widely known, or the like can be selected and reproduced as background sound.

In this case, the user can sense the progress with respect of entire speech or remaining time before the speech ends by recognizing how long the music lasts on the basis of a phrase or melody of the piece of music that the user knows as previous knowledge, which is, for example, a first verse and a second verse, A melody and B melody, a high point, or the like of the music.

Also in this case, for example, since a phrase or item (list information) in the object speech can be associated with a part of the music or the like as the background sound, this helps the user to easily memorize the item, or the like. Such progress presentation using the background sound is particularly effective in a case where speech reproduction time of the object speech is long.

Configuration Example of Sound Speech Progress Presentation UI System

Figure 15:
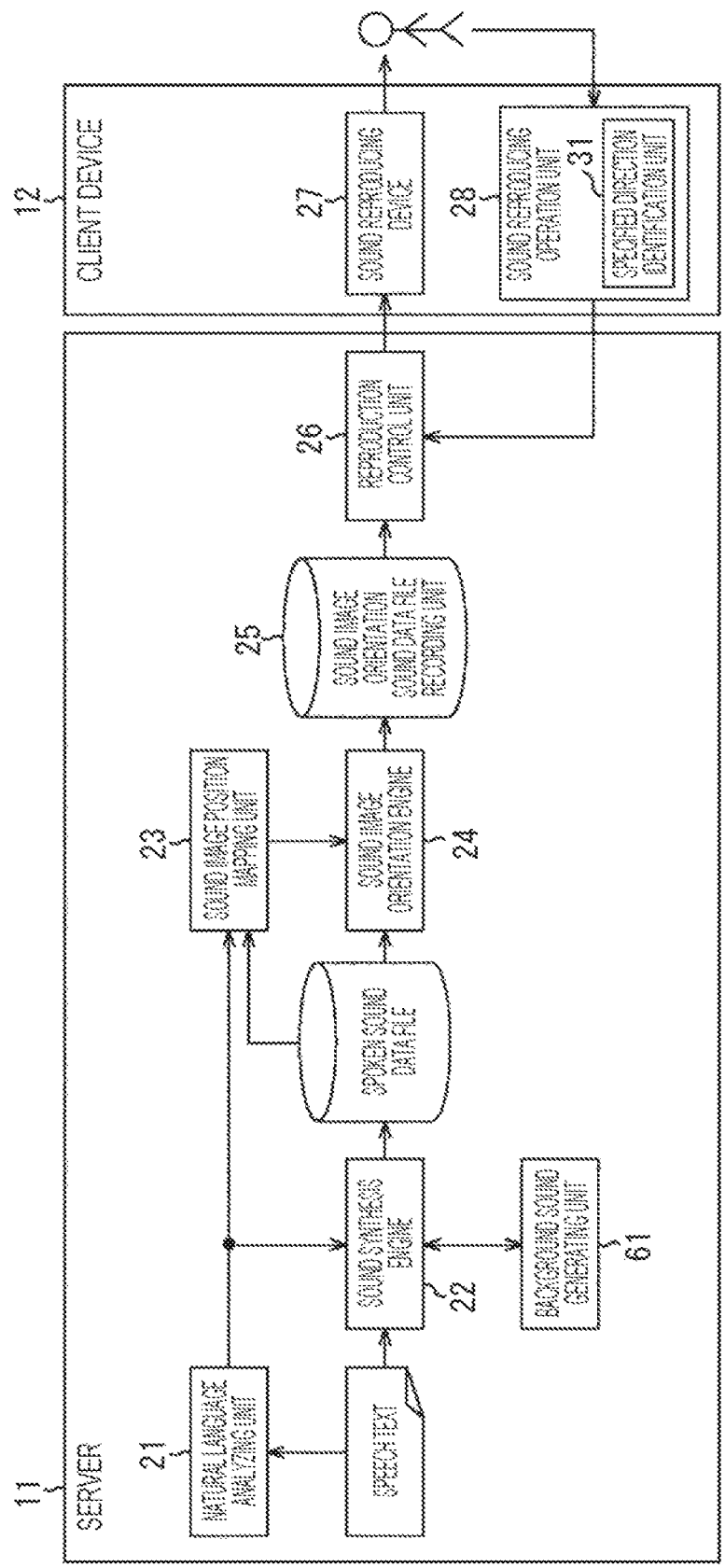
FIG. 15 is a diagram illustrating a configuration example of a sound speech progress presentation UI system.

In a case where a progress presentation of an object speech is performed using a background sound in this manner, the sound speech progress presentation UI system is composed as illustrated in FIG. 15, for example. Note that, in FIG. 15, a part corresponding to the part in FIG. 3 is applied with the same reference numeral and the explanation thereof will be omitted as appropriate.

The configuration of the sound speech progress presentation UI system illustrated in FIG. 15 is a configuration in which a background sound generating unit 61 is newly provided in the configuration of the sound speech progress presentation UI system illustrated in FIG. 3, and other parts of the configuration are similar to those in the sound speech progress presentation UI system illustrated in FIG. 3.

The background sound generating unit 61 selects a piece of music or the like having reproduction time substantially the same as the reproduction time of the object speech on the basis of sound data of the object speech provided from the sound synthesis engine 22, generates background sound data of background sound, and provides the data to the sound synthesis engine 22.

Note that the background sound may be a piece of music or the like as described above, or may be a countdown sound, a sound that informs a remaining time or a progress rate of the speech, an effective sound, or the like. Furthermore, in a case of generating the background sound data, the background sound generating unit 61 may change a reproduction speed of the background sound by a certain speed amount as appropriate so that the reproduction time of the background sound becomes substantially the same as the reproduction time of the object speech.

The sound synthesis engine 22 generates a spoken sound data file including sound data of the object speech, reproduction time information, and background sound data from the background sound generating unit 61, and provides the file to the sound image position mapping unit 23 and sound image orientation engine 24.

Furthermore, in the sound image orientation engine 24, a sound image orientation sound data file is generated on the basis of the spoken sound data file provided from the sound synthesis engine 22 and the sound image position information and metadata provided from the sound image position mapping unit 23.

In this case, while the sound image orientation sound data file is made to include at least the sound image orientation sound data of the object speech and the background sound data, the sound of the object speech based on the sound image orientation sound data may have the sound image that moves according to the progress or may be the sound image continuously oriented toward a certain direction. In other words, the progress presentation may be performed using the sound image movement or may be performed without the sound image movement.

Furthermore, for example, in a case where the background sound is a countdown sound or a sound that informs remaining time or a progress rate of the speech, or the like, a sound image position information of the background sound may be generated by the sound image position mapping unit 23. In such a case, in the sound image orientation engine 24, background sound data of the background sound in which a sound image moves according to the progress of the object speech is generated on the basis of the sound image position information and background sound data and stored in the sound image orientation sound data file.

In this case, for example, the sound image of the object speech may be continuously oriented to the same direction such as a straight forward direction, or the sound image of the background sound and the sound image of the object speech sound may be oriented to the same position and made to move according to the progress.

For example, in a case where the sound image of the background sound is oriented to the position same as the sound image of the object speech and the sound image of the background sound moves together with the sound image of the object speech, while the progress presentation is performed by moving the sound images, the background sound can be presented as auxiliary information of the progress presentation to the user. With this arrangement, the user can recognize the progress of the speech more accurately. In such a progress presentation, for example, as in the example described with reference to FIG. 2 or FIG. 9, the sound image moves according to the progress of the spoken sound and, at the same time, the sound image of the background sound is also moves in the same manner.

Furthermore, the progress of the object speech may be presented by using the background sound alone without moving the sound image of the object speech and the sound image of the background sound. Furthermore, the progress presentation may also be performed by reproducing the background sound without moving the sound image of the background sound while presenting the progress by moving the sound image of the object speech. Note that, in a case where the sound image of the background sound is made to move, in the sound image position mapping unit 23, a process similar to generating the sound image position information of the object speech is performed and sound image position information of the background sound is generated. Furthermore, in the sound image orientation engine 24, in the process similar to generating the sound image orientation sound data, background sound data for reproducing background sound in which a position of a sound image moves toward a predetermined direction is generated on the basis of the sound image position information of the background sound and background sound data.

<Description of Reproduction Process>

Next, a reproduction process, which is a process that the sound speech progress presentation UI system illustrated in FIG. 15 reproduces sound of an object speech and a background sound, will be described.

Figure 16:
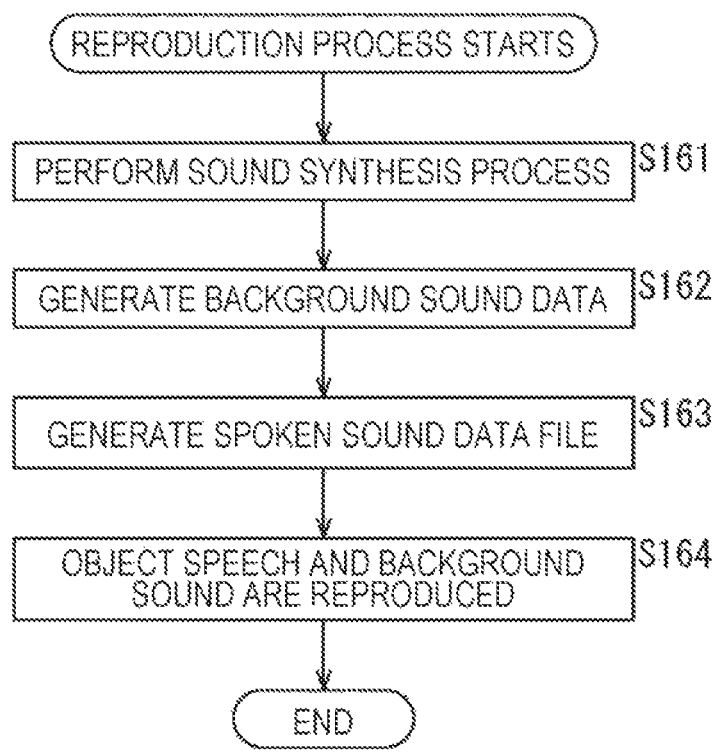
FIG. 16 is a flowchart for explaining a reproduction process.

In other words, in the following, with reference to the flowchart of FIG. 16, the reproduction process by the sound speech progress presentation UI system will be described. Note that, an example that a sound image of an object speech and a sound image of a background sound are oriented toward a straight forward direction as seen from the user will be described. In other words, an example that the sound image does not move will be described.

In step S161, the sound synthesis engine 22 generates sound data of the object speech by performing a sound synthesis process on a provided speech text and provides the data to the background sound generating unit 61.

In step S162, the background sound generating unit 61 generates sound data such as a piece of music having reproduction time substantially the same as the reproduction time of the object speech as the background sound data on the basis of the object speech sound data provided from the sound synthesis engine 22 and provides the data to the sound synthesis engine 22.

In step S163, the sound synthesis engine 22 generates a spoken sound data file including the sound data of the object speech generated in step S161 and the background sound data provided from the background sound generating unit 61 and provides the file to the sound image orientation engine 24.

The sound image orientation engine 24 generates a sound image orientation sound data file on the basis of the spoken sound data file provided from the sound synthesis engine 22 and provides the file to the sound image orientation sound data file recording unit 25 to be recorded. For example, the sound image orientation engine 24 converts the monaural sound data and background sound data into sound data and background sound data in two channels of right and left and generates a sound image orientation sound data file including the two-channel object speech sound data and background sound data.

In step S164, the reproduction control unit 26 reads the sound image orientation sound data file recorded in the sound image orientation sound data file recording unit 25 and provides the file to the sound reproducing device 27 so that the object speech and background sound are reproduced. By reproducing the object speech and background sound in this manner, the reproduction control unit 26 controls the sound output that aurally expresses the progress of the object speech with respect to the entire speech.

The sound reproducing device 27 reproduces the object speech sound and background sound at the same time on the basis of the sound data and background sound data included in the sound image orientation sound data file provided from the reproduction control unit 26. Then, the user can listen to the background sound together with the object speech. Furthermore, the user can recognize the progress of the object speech by the background sound.

Note that, regarding the reproduction of the background sound, as the sound output according to the progress, the reproduction sound volume of the background sound may be decreased as the object speech proceeds so that the progress of the object speech can be recognized also by the sound volume of the background sound.

Furthermore, a sound effect such as an echo is applied to the background sound or object speech sound, and the sound effect applied to the background sound or object speech may be reduced as the object speech proceeds or a tone or the like of the background sound may be changed as the object speech proceeds.

As described above, the sound speech progress presentation UI system generates a sound image orientation sound data file including the sound data of the object speech and the background sound data of the background sound and controls to reproduce the background sound together with the object speech. By performing the sound output that aurally expresses the progress with respect to the entire spoken sound such that a background sound is reproduced together with an object speech sound in this manner, progress of the sound reproduction can be presented to the user.

Note that, for example, in a case where a countdown sound, a sound that informs remaining time or a progress rate of the speech, or the like is reproduced as a background sound together with the object speech sound in the sound speech progress presentation UI system illustrated in FIG. 15, the object speech may be made not to be hard to listen.

More specifically, for example, if the object speech sound and the spoken sound of the background sound have sound images oriented to different directions (positions) from each other, the object speech sound and background sound are prevented from being mixed and the both sounds can be made clear to listen to.

In addition, for example, by differentiating the object speech sound and the spoken sound of the background sound with voices of different genders, the object speech sound and background sound are prevented from being mixed and each sound can be made clear to be listened. In this case, for example, while the object speech sound may be reproduced with a female voice while the background sound may be reproduced with a male voice.

Furthermore, the above description has described an example that the present technology is applied to a system sound speech that generates a spoken sound from a speech text. However, in addition to the example, the present technology can be applied to a case where progress of some sound reproduction is aurally presented, such as a case where a visual progress bar is not shown during reproduction of music or reproduction of a moving image and the progress of the reproduction is presented by using the sound image or a background sound.

Configuration Example of Computer

Here, the above described series of processes may be executed by hardware or may be executed by software. In a case where the series of processes is executed by software, a program composing the software is installed in the computer. The computer here includes a computer mounted in a dedicated hardware, a general personal computer for example, which can execute various functions by installing various programs, or the like.

Figure 17:
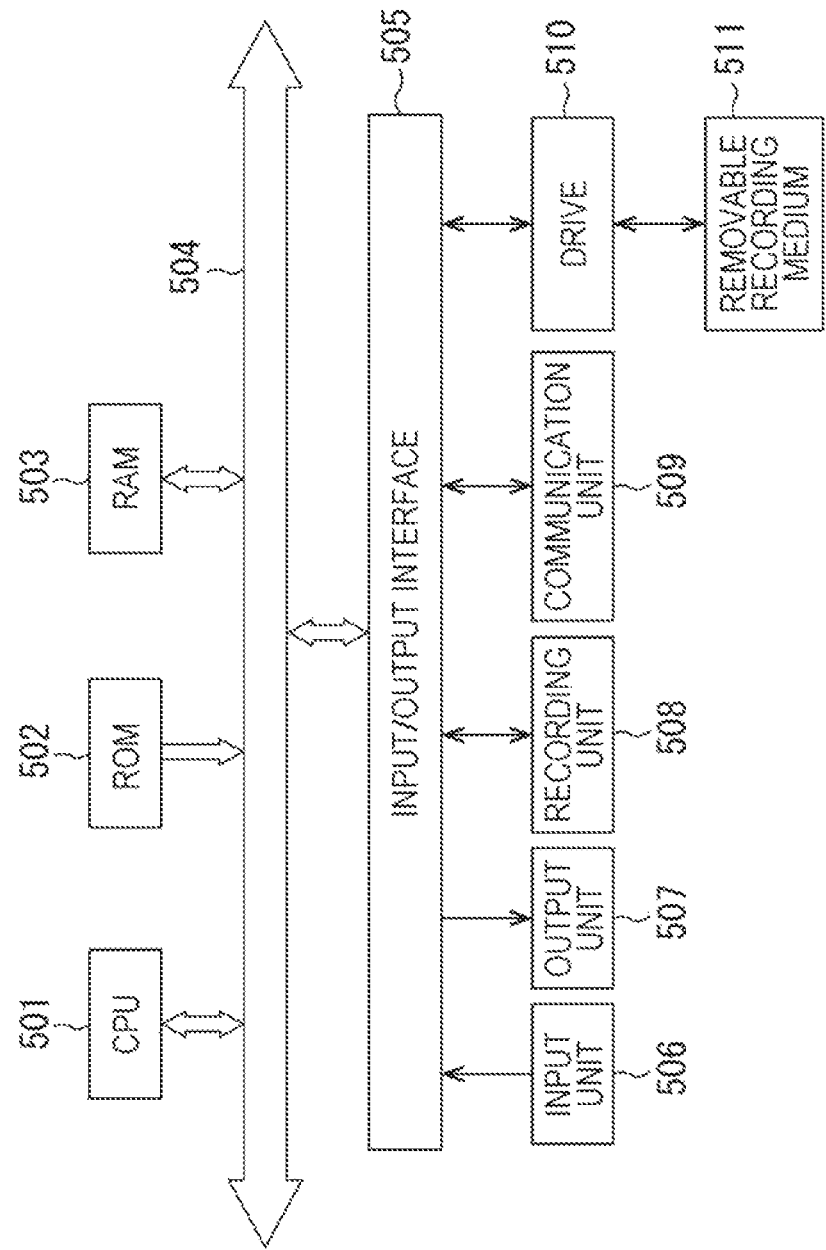
FIG. 17 is a diagram illustrating a configuration example of a computer.

FIG. 17 is a block diagram illustrating a configuration example of hardware of a computer, which executes the above described series of processes according to a program.

In the computer, a central processing unit (CPU) 501, a read only memory (ROM) 502, and a random access memory (RAM) 503 are connected to one another via a bus 504.

To the bus 504, an input/output interface 505 is further connected. To the input/output interface 505, an input unit 506, an output unit 507, a recording unit 508, a communication unit 509, and a drive 510 are connected.

The input unit 506 includes a keyboard, a mouse, a microphone, an image pickup element, or the like. The output unit 507 includes a display, a speaker, or the like. The recording unit 508 includes a hard disk, a non-volatile memory, or the like. The communication unit 509 includes a network interface or the like. The drive 510 derives the removable recording medium 511 such as a magnetic disk, an optical disk, a magnetic optical disk, or a semiconductor memory.

In the computer composed as described above, the above described series of processes is performed by, for example, that the CPU 501 loads a program recorded in the recording unit 508 to the RAM 503 via the input/output interface 505 and the bus 504 and executes the program.

The program executed by the computer (CPU 501) can be provided by being recorded in the removable recording medium 511 as a portable medium or the like, for example. Furthermore, the program can be provided via a wired or wireless transmission medium such as a local area network, the Internet, or digital satellite broadcasting.

In the computer, the program can be installed to the recording unit 508 via the input/output interface 505 by attaching the removable recording medium 511 to the drive 510. Furthermore, the program can be received by the communication unit 509 via a wired or wireless transmission medium and installed to the recording unit 508. In addition, the program can be installed in the ROM 502 or recording unit 508 in advance.

Note that the program executed by the computer may be a program that executes the processes chronology in order described in this specification or may be a program that executes the processes in parallel or at necessary timing such as timing when a request is made.

Furthermore, the embodiments of the present technology are not limited to the above described embodiments and various changes can be made within the scope of the present technology.

For example, the present technology may be realized with a cloud computing configuration that a single function is processed by a plurality of devices as being shared or cooperated via a network.

Furthermore, each step described in the above flowcharts may be shared and executed by a plurality of devices, in addition to a case of being executed by a single device.

Furthermore, in a case where a plurality of processes are included in one step, the plurality of processes included in the step may be shared and executed by a plurality of devices, in addition to a case of being executed by a single device.

Furthermore, the present technology may have following configurations.

(1)

A sound processing device including a control unit configured to control a sound output that aurally expresses progress of sound reproduction with respect to an entirety of the sound reproduction according to reproduction of a sound.

(2)

The sound processing device according to (1), in which the sound is a spoken sound based on a speech text.

(3)

The sound processing device according to (1) or (2), in which the control unit controls the sound output that expresses the progress by using a sound image position.

(4)

The sound processing device according to (3), in which the control unit controls the sound output in which an orientation position of a sound image differs in each reproduction section including a speech of a presentation item and the sound image moves toward a predetermined direction according to the progress of the sound reproduction.

(5)

The sound processing device according to (4), in which the control unit identifies the reproduction section corresponding to a specified direction on the basis of metadata including information indicating reproduction start time of the reproduction section of the sound and information related to a direction of the sound image in the reproduction section, and operates to start reproducing the sound from the specified reproduction section.

(6)

The sound processing device according to (5), in which a range including the direction of the sound image in the reproduction section is defined for each reproduction section so that the reproduction section including the presentation item with a higher level of importance is allocated with a wider range, and the control unit identifies the reproduction section having the range including the specified direction on the basis of the metadata and operates to start reproducing the sound from the specified reproduction section.

(7)

The sound processing device according to (3), in which the control unit controls an output of the sound in which the sound image continuously moves toward a predetermined direction according to the progress of the sound reproduction.

(8)

The sound processing device according to (1) or (2), in which the control unit controls the sound output that expresses the progress by operating to reproduce a background sound that expresses the progress of the sound reproduction while operating to reproduce the sound.

(9)

The sound processing device according to (8), in which the background sound is a piece of music having reproduction time substantially the same as a length of the sound.

(10)

The sound processing device according to (8), in which the background sound is a sound that counts down time remaining before the sound reproduction ends.

(11)

The sound processing device according to (8), in which the background sound is a sound that informs time remaining before the sound reproduction ends or a progress rate of the sound reproduction, at predetermined time intervals.

(12)

A sound processing method including a step of controlling a sound output that aurally expresses progress of sound reproduction with respect to an entirety of the sound reproduction according to reproduction of a sound.

(13)

A sound processing device including a reproduction control unit configured to identify a reproduction section corresponding to a specified direction on the basis of metadata including information indicating reproduction start time of the reproduction section in a sound, in which an orientation position of a sound image differs in each reproduction section and the sound image moves toward a predetermined direction according to progress of sound reproduction with respect to an entirety of the sound reproduction, and information related to a direction of the sound image in the reproduction section, and operate to start reproducing the sound from the specified reproduction section.

(14)

A sound processing method including a step of identifying a reproduction section corresponding to a specified direction on the basis of metadata including information indicating reproduction start time of the reproduction section in a sound, in which an orientation position of a sound image differs in each reproduction section and the sound image moves toward a predetermined direction according to progress of sound reproduction with respect to an entirety of the sound reproduction, and information related to a direction of the sound image in the reproduction section, and operating to start reproducing the sound from the specified reproduction section.

REFERENCE SIGNS LIST

11 Server
12 Client device
21 Natural language analyzing unit
22 Sound synthesis engine
23 Sound image position mapping unit
24 Sound image orientation engine
26 Reproduction control unit
27 Sound reproducing device
28 Sound reproducing operation unit
31 Specified direction identification unit
61 Background sound generating unit

The invention claimed is:

1. A sound processing device, comprising:
a control unit configured to:
control output of a first sound corresponding to a first sound image, wherein the first sound is output by sound reproduction;
control movement of the first sound image of the first sound in a first direction based on a progress of the sound reproduction of the first sound to aurally express the progress of the sound reproduction of the first sound with respect to an entirety of the sound reproduction of the first sound;
control output of a second sound corresponding to a second sound image at a time of reproduction of the first sound; and
control movement of the second sound image in a second direction different from the first direction of the movement of the first sound image, wherein the movement of the second sound image in the second direction indicates the progress of the sound reproduction of the first sound.

2. The sound processing device according to claim 1, wherein the first sound is a spoken sound based on a speech text.

3. The sound processing device according to claim 1, wherein the control unit is further configured to control the output of the first sound that expresses the progress of the sound reproduction by using a position of the first sound image of the first sound.

4. The sound processing device according to claim 3, wherein the control unit is further configured to:
control the output of the first sound such that an orientation position of the first sound image differs in each reproduction section of a plurality of reproduction sections; and
control the output of the first sound such that the first sound image moves toward a determined direction based on the progress of the sound reproduction of the first sound.

5. The sound processing device according to claim 4, wherein the control unit is further configured to:
identify a reproduction section of the plurality of reproduction sections that corresponds to a specified direction based on metadata, the metadata including:
information indicating reproduction start time of the reproduction section of the first sound; and
information related to the first direction of the first sound image in the reproduction section; and
start reproduction of the first sound from the identified reproduction section.

6. The sound processing device according to claim 5, wherein
the first sound image includes a speech of a plurality of presentation items,
an angle of output of each of the plurality of presentation items in the first direction of the first sound image is defined for each reproduction section of the plurality of reproduction sections based on a level of importance of each of the plurality of presentation items,
the level of importance of each of the plurality of presentation items is defined by a user,
the reproduction section including a first presentation item of the plurality of presentation items with a higher level of importance is allocated with a wider angle than a second presentation item of the plurality of presentation items with a lower level of importance, and
the control unit is further configured to:
identify the reproduction section including the angle of output of each of the plurality of presentation items in the specified direction based on the metadata; and
start reproduction of the first sound from the identified reproduction section.

7. The sound processing device according to claim 3, wherein the control unit is further configured to control the output of the first sound such that the first sound image continuously moves toward the first direction based on the progress of the sound reproduction of the first sound.

8. The sound processing device according to claim 1, wherein the second sound comprises a background sound that expresses the progress of the sound reproduction.

9. The sound processing device according to claim 8, wherein the second sound is a piece of music having reproduction time same as a length of the first sound.

10. The sound processing device according to claim 8, wherein the second sound is a sound that counts down time remaining before the sound reproduction of the first sound ends.

11. The sound processing device according to claim 8, wherein the second background sound is a sound that indicates one of time remaining before the sound reproduction of the first sound ends or a progress rate of the sound reproduction of the first sound, at determined time intervals.

12. A sound processing method, comprising:
controlling output of a first sound corresponding to a first sound image, wherein the first sound is output by sound reproduction;
controlling movement of the first sound image of the first sound in a first direction based on a progress of the sound reproduction of the first sound to aurally express the progress of the sound reproduction of the first sound with respect to an entirety of the sound reproduction of the first sound;

controlling output of a second sound corresponding to a second sound image at a time of reproduction of the first sound; and controlling movement of the second sound image in a second direction different from the first direction of the movement of the first sound image, wherein the movement of the second sound image in the second direction indicates the progress of the sound reproduction of the first sound.

13. A sound processing device, comprising:
a reproduction control unit configured to:
   identify a reproduction section of a plurality of reproduction sections that corresponds to a specified direction based on metadata, the metadata including:
      information indicating reproduction start time of the reproduction section of a spoken sound;
      information related to a direction of a sound image corresponding to the reproduction section, wherein
         an orientation position of the sound image differs in each reproduction section of the plurality of reproduction sections, and
         the sound image includes a speech of a plurality of presentation items; and
      information of an angle of output of each of the plurality of presentation items with respect to a user in the direction of the sound image, wherein
         a level of importance of each of the plurality of presentation items is defined by the user; and
   control output of the spoken sound from the identified reproduction section in the specified direction such that a first presentation item of the plurality of presentation items with a first level of importance is output at a wider angle with respect to the user than a second presentation item of the plurality of presentation items with a second level of importance, wherein the first level of importance is higher than the second level of importance.

14. A sound processing method, comprising:
identifying a reproduction section of a plurality of reproduction sections corresponding to a specified direction based on metadata, the metadata including:
   information indicating reproduction start time of the reproduction section of a spoken sound;
   information related to a direction of a sound image corresponding to the reproduction section, wherein
      an orientation position of the sound image differs in each reproduction section of the plurality of reproduction sections, and
      the sound image includes a speech of a plurality of presentation items; and
   information of an angle of output of each of the plurality of presentation items with respect to a user in the direction of the sound image, wherein
      a level of importance of each of the plurality of presentation items is defined by the user; and
controlling output of the spoken sound from the identified reproduction section in the specified direction such that a first presentation item of the plurality of presentation items with a first level of importance is output at a wider angle with respect to the user than a second presentation item of the plurality of presentation items with a second level of importance, wherein the first level of importance is higher than the second level of importance.

15. The sound processing device according to claim 1, wherein the control unit is further configured to change the first direction of the output of the first sound such that a first duration of the first sound is aurally output from a left direction, a middle duration of the first sound is aurally output from a straight forward direction, a last duration of the first sound is aurally output from a right direction with respect to a user based on the progress of the sound reproduction of the first sound.

16. The sound processing device according to claim 13, wherein
   the reproduction control unit is further configured to determine the direction of the sound image in the reproduction section based on information related to a language of the spoken sound, and
   the direction in which the sound image moves is determined to be from right to left in a case where the language of the spoken sound is a first language.

17. The sound processing device according to claim 16, wherein
   the reproduction control unit is further configured to determine the direction in which the sound image moves to be from up to down in a case where the language of the spoken sound is a second language different from the first language.

18. The sound processing device according to claim 1, wherein the control unit is further configured to decrease a volume of the second sound based on the progress of the sound reproduction of the first sound to aurally express the progress of the sound reproduction of the first sound.

* * * * *